(12) United States Patent
Mizuno et al.

(10) Patent No.: US 8,095,760 B2
(45) Date of Patent: Jan. 10, 2012

(54) ADJUSTMENT NUMBER OF EXPANDERS IN STORAGE SYSTEM

(75) Inventors: Makio Mizuno, Sagamihara (JP); Shuji Nakamura, Machida (JP)

(73) Assignee: Hitachi, Ltd., Tokyo (JP)

( * ) Notice: Subject to any disclaimer, the term of this patent is extended or adjusted under 35 U.S.C. 154(b) by 707 days.

(21) Appl. No.: 12/163,741

(22) Filed: Jun. 27, 2008

(65) Prior Publication Data
US 2009/0259791 A1 Oct. 15, 2009

(30) Foreign Application Priority Data

Apr. 14, 2008 (JP) ................................. 2008-104638

(51) Int. Cl.
*G06F 13/00* (2006.01)
(52) U.S. Cl. ........ 711/165; 711/114; 710/74; 361/679.4
(58) Field of Classification Search .................. None
See application file for complete search history.

(56) References Cited

U.S. PATENT DOCUMENTS

| | | | | |
|---|---|---|---|---|
| 6,055,228 | A * | 4/2000 | DeKoning et al. | 370/258 |
| 7,457,835 | B2 * | 11/2008 | Toebes et al. | 1/1 |
| 2003/0115387 | A1 * | 6/2003 | Stover et al. | 710/60 |
| 2003/0182504 | A1 * | 9/2003 | Nielsen et al. | 711/114 |
| 2004/0260875 | A1 * | 12/2004 | Murotani et al. | 711/114 |
| 2006/0095666 | A1 * | 5/2006 | Furuhashi et al. | 711/114 |
| 2007/0050538 | A1 * | 3/2007 | Northcutt et al. | 711/112 |
| 2007/0083575 | A1 * | 4/2007 | Leung et al. | 707/205 |
| 2008/0080131 | A1 * | 4/2008 | Hori et al. | 361/685 |
| 2008/0195581 | A1 * | 8/2008 | Ashmore et al. | 707/3 |
| 2009/0125655 | A1 * | 5/2009 | Jones et al. | 710/104 |

OTHER PUBLICATIONS

Robert C. Elliot, Information technology—Serial Attached SCSI-1.1 (SAS-1.1), revision 10, ISO/IEC 14776-151, Sep. 21, 2005.

* cited by examiner

*Primary Examiner* — Kaushikkumar Patel
(74) *Attorney, Agent, or Firm* — Sughrue Mion, PLLC

(57) ABSTRACT

A storage system for storing data includes: a plurality of storage devices; a controller device; a plurality of expanders; and a path adjusting unit. The path adjusting unit includes: a target specifying unit, a destination selecting unit; and a data migrating unit. The target specifying unit specifies target data to be targeted for adjustment in the plurality of storage devices. The destination selecting unit selects a storage device in which to store the specified target data to reduce the number of expanders on a data transfer pathway for the specified target data. The data migrating unit migrates the specified target data to the selected storage device.

19 Claims, 27 Drawing Sheets

Fig.3

LU MANAGEMENT TABLE 910

| LU IDENTIFICATION SYMBOL 9110 | HDD IDENTIFICATION SYMBOL 9120 | EXPANDER STAGE NUMBER 9130 |
|---|---|---|
| LU0 | HDD2 | 2 |
| LU1 | HDD5 | 5 |
| LU2 | HDD3 | 3 |
| LU3 | HDD4 | 4 |
| – | HDD1 | 1 |
| ⋮ | ⋮ | ⋮ |

Fig.4

REQUESTED PERFORMANCE TABLE — 920

| LU IDENTIFICATION SYMBOL | REQUESTED PERFORMANCE |
|---|---|
| LU0 | 800MB/s |
| LU1 | 500MB/s |
| LU2 | 300MB/s |
| LU3 | 300MB/s |

9210 / 9220

ADJUSTMENT NUMBER OF EXPANDERS IN STORAGE SYSTEM

CROSS-REFERENCE TO RELATED APPLICATIONS

The present application claims the priority based on Japanese Patent Application No. 2008-104638 filed on Apr. 14, 2008, the disclosure of which is hereby incorporated by reference in its entirety.

BACKGROUND

The present invention relates to a storage system for storing data in a computer system, and in particular relates to a storage system equipped with multiple storage devices arranged in a daisy chain connection.

Known storage systems to date include systems equipped with multiple storage devices including hard disk drives (HDD) and with a controller device which controls the multiple storage devices, the devices being connected in a daisy chain arrangement via expanders. In storage systems of this kind it is conceivably possible to implement communication protocols such as SAS (Serial Attached SCSI) or SATA (Serial ATA) for the purpose of peer to peer communication among the controller device and the storage devices. An SAS-based standard is described in Non-patent Citation, Information technology—Serial Attached SCSI-1.1 (SAS-1.1) ISO/IEC 14776-151, Sep. 21, 2005.

SUMMARY

In a storage system equipped with a plurality of storage devices connected in a daisy chain, despite the fact that latency will increase in association with a greater numbers of expanders on the transfer pathway between the controller device and storage devices, related arts have not given sufficient consideration to the effects that the number of expanders on transfer pathways can have on latency. Herein, the term latency refers to the delay time from the time that a host computer connected to the storage system requests data, to the time that the data actually arrive at the host computer. For example, in the case where an expander has been added on and the number of storage devices increased in order to address insufficient storage capacity in a storage system, newer data (which can be expected to be accessed with relatively high frequency) will tend to be stored in storage devices requiring data transfer to take place through a greater number of expanders, thus creating the problem of increased average latency in the storage system as a whole.

In view of this problem, an advantage of some aspects of the invention is to provide technology for reducing latency in a storage system equipped with multiple storage devices in a daisy chain connection.

An advantage of some aspects of the invention is intended to address this issue at least in part, and can be reduced to practice as described below.

A storage system according to a first aspect of the invention is a storage system for storing data, the storage system comprising: a plurality of storage devices; a controller device; a plurality of expanders; and a path adjusting unit. The plurality of storage devices behaves as a plurality of targets for storing the data. The target is compliant with a communication protocol for peer to peer communication between daisy chain connected devices. The controller device behaves as an initiator to control the plurality of storage devices. The initiator is compliant with the communication protocol. The plurality of expanders connects the controller device and the plurality of storage devices by daisy chain connection compliant with the communication protocol. The path adjusting unit adjusts the number of expanders on a data transfer pathway between the controller device and the storage device. The path adjusting unit includes: a target specifying unit; a destination selecting unit; and a data migrating unit. The target specifying unit specifies target data to be targeted for adjustment from among data stored in the plurality of storage devices. The destination selecting unit selects, from among the plurality of storage devices, a storage device in which to store the specified target data to reduce the number of expanders on a data transfer pathway for the specified target data. The data migrating unit migrates the specified target data to the selected storage device. According to the above-mentioned storage system, data stored on multiple storage devices will be migrated among these storage devices in such a way as to reduce the number of expanders on the data transfer pathway, thereby avoiding latency attributable to the number of expanders on the data transfer pathway.

A storage system according to a second aspect of the invention is a storage system for storing data, the storage system comprising: a plurality of storage devices; a controller device; a plurality of expanders; and a path adjusting unit. The plurality of storage devices behaves as a plurality of targets for storing the data. The target is compliant with a communication protocol for peer to peer communication between daisy chain connected devices. The controller device behaves as an initiator to control the plurality of storage devices. The initiator is compliant with the communication protocol. The plurality of expanders connects the controller device and the plurality of storage devices by daisy chain connection compliant with the communication protocol. The path adjusting unit adjusts the number of expanders on a data transfer pathway between the controller device and the storage device. The path adjusting unit includes: a device specifying unit, a path comparing unit; and a path setting unit. The device specifying unit specifies a storage device to be targeted for adjustment from among the plurality of storage devices. The path comparing unit compares the number of expanders on a first data transfer pathway and the number of expanders on a second data transfer pathway. The first and second data transfer pathway lead to the specified storage device through different routes. The path setting unit sets, as a data transfer pathway for the specified storage device, the compared data transfer pathway which has the smaller number of expanders. According to the above-mentioned storage system, since a data transfer pathway with fewer expanders will be selected with reference to the data, latency attributable to the number of expanders on the data transfer pathway can be avoided.

The invention is not limited to a storage system embodiment, and may be reduced to practice in various other modes such as a management device which manages a storage system; a computer program for performing the functions of a storage system or a management device; a recording medium having such a program recorded thereon in computer-readable form; or a method for managing a storage system. Nor is the invention limited to the foregoing embodiments, and various alternative embodiments can be made herein without departing from the scope of the invention.

These and other objects, features, aspects, and advantages of the invention will become more apparent from the following detailed description of the preferred embodiments with the accompanying drawings.

BRIEF DESCRIPTION OF THE DRAWINGS

The invention will be described with reference to the accompanying drawings in which:

FIG. 3 shows an illustration depicting an LU management table in Embodiment 1;

FIG. 4 shows an illustration showing a requested performance table of a main control unit;

DESCRIPTION OF THE PREFERRED EMBODIMENTS

In order to provide a better understanding of the design and advantages of the invention, a computer system implementing the invention will be described below, following the outline indicated below.

A. Embodiment 1
  A1. Computer System Configuration
  A2. Computer System Operation
  A3. Effects
  A4. Modification Examples
    A4-1. Modification Example a1
    A4-2. Modification Example a2
    A4-3. Modification Example a3
    A4-4. Modification Example a4
    A4-5. Modification Example a5
    A4-6. Modification Example a6
    A4-7. Modification Example a7
    A4-8. Modification Example a8
    A4-9. Modification Example a9
    A4-10. Modification Example a10
B. Embodiment 2
  B1. Computer System Configuration
  B2. Computer System Operation
  B3. Effects
  B4. Modification Examples
    B4-1. Modification Example b1
    B4-2. Modification Example b2
    B4-3. Modification Example b3
C. Alternative Embodiments
  C1. Modification Example a11

A. Embodiment 1

Figure 1:
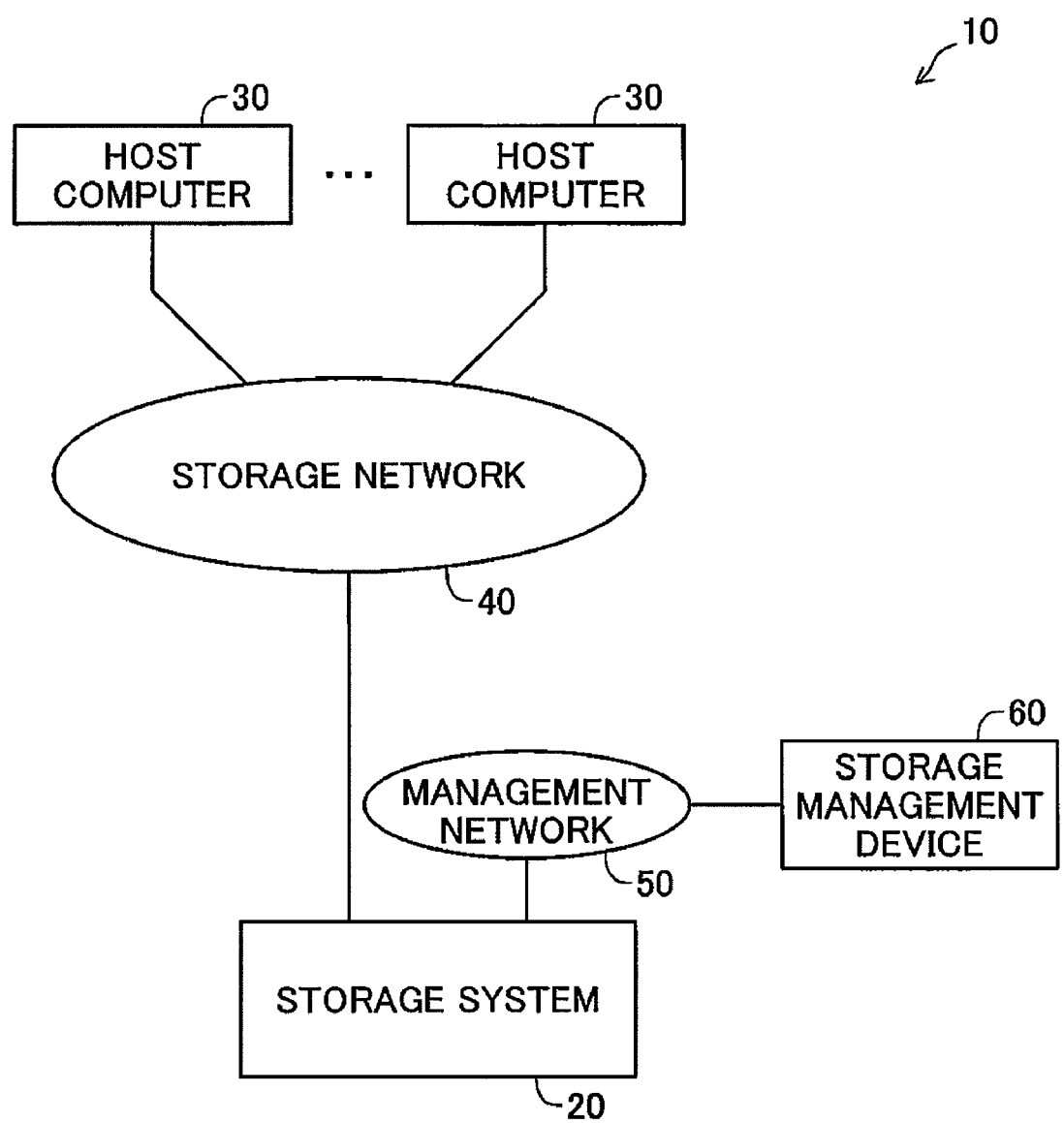
FIG. 1 shows an illustration depicting a configuration of a computer system.

A1. Computer System Configuration:

FIG. 1 is an illustration depicting the configuration of a computer system 10. The computer system 10 includes a host computer 30, a storage system 20, and a storage network 40. The host computer 30 of the computer system 10 executes information processing electronically. The host computer 30 includes hardware resources such as a central processing unit (hereinafter "CPU"), memory, and various types of interfaces, and the computer executes various kinds of information processing on the basis of software programs. In response to instructions from the host computer 30, the storage system 20 of the computer system 10 will store data that are being processed by the host computer 30. The specific configuration of the storage system 20 will be described later. The storage network 40 of the computer system 10 connects the host computer 30 and the storage system 20 so as to enable exchange of data between them. In the present embodiment, the storage system 20 is connectable to multiple host computers 30 via the storage network 40, and is capable of storing data being processed respectively by the different host computers 30.

In the present embodiment, the computer system 10 further includes a storage management device 60 and a management network 50. The storage management device 60 of the computer system 10 manages the operation of the storage system 20. The storage management device 60 is a computer which includes hardware resources such as CPU, memory, and various types of interfaces, and which executes various kinds of information processing on the basis of software programs. The management network 50 of the computer system 10 connects the storage management device 60 and the storage system 20 so as to enable exchange of data between them. In the present embodiment, the management network 50 is constituted as a separate network from the storage network 40; in an alternative embodiment, however, the management network 50 could be constituted as a network in common with the storage network 40.

Figure 2:
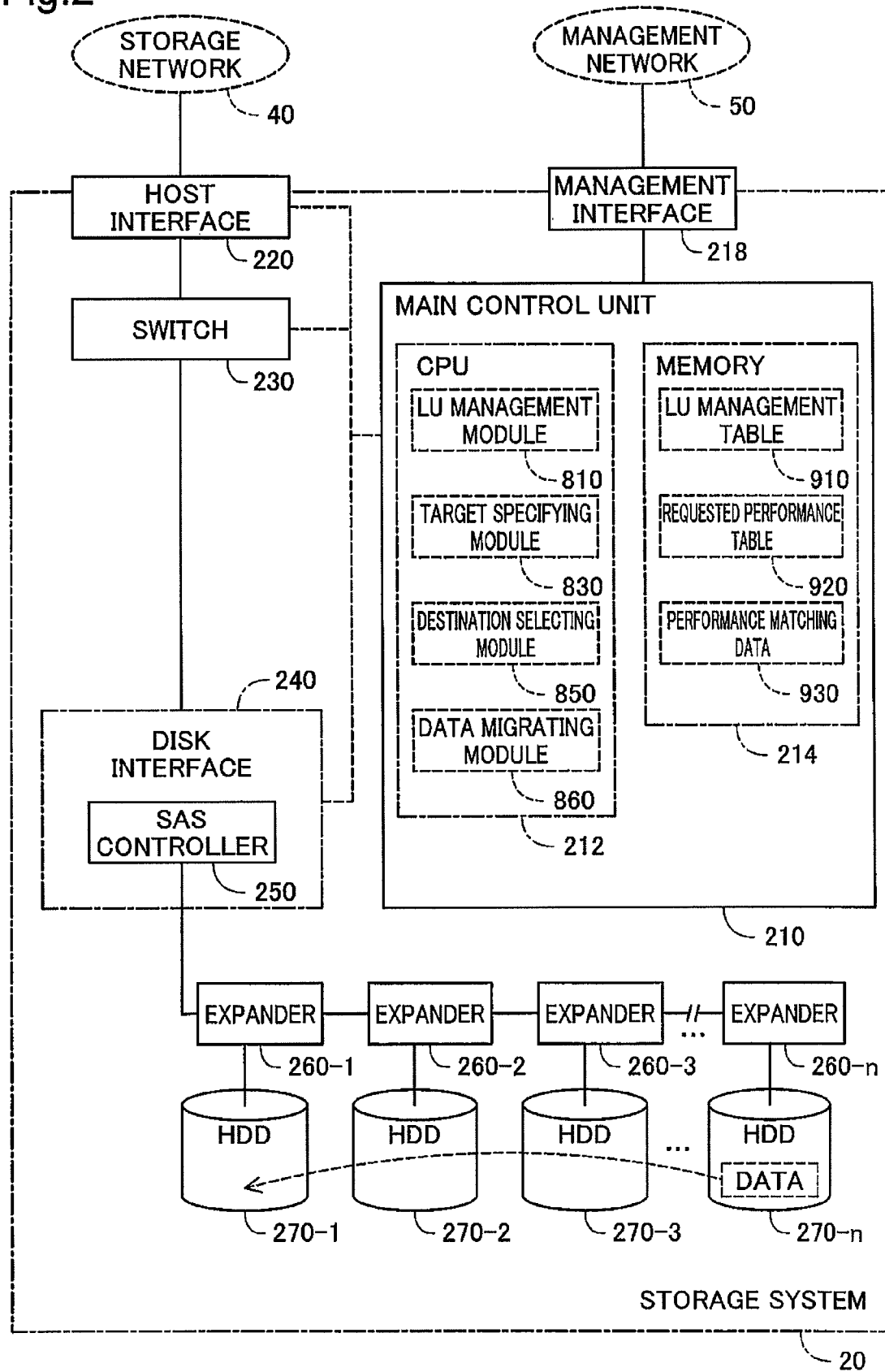
FIG. 2 shows an illustration depicting primarily a configuration of a storage system in Embodiment 1.

FIG. 2 is an illustration depicting primarily the configuration of the storage system 20 in Embodiment 1. The storage system 20 includes an SAS controller 250, a plurality of expanders 260, and a plurality of hard disk drives (hereinafter "HDD"). The SAS controller 250 of the storage system 20 is equipped with circuit chips and connection ports which operate as SAS initiators compliant with the SAS (Serial Attached SCSI, hereinafter "SAS") protocol, and controls writing and reading of data to and from the HDDs 270. The expanders 260 of the storage system 20 are equipped with circuit chips and connection ports which operate as SAS expanders compliant with the SAS protocol, and connect the SAS controller 250 with the HDDs 270 in a daisy chain connection enabling SAS-compliant data transfer.

Each of the HDDs 270 of the storage system 20 will be equipped with a hard disk drive coated with a magnetic material, a magnetic head, and additionally with a circuit chip which operates as an SAS target; and will store data on the basis of instructions from the SAS controller 250. While in the present embodiment, HDDs are employed as the storage devices for storing data by way of SAS initiators, by way of alternative embodiments it would be possible to employ other storage devices such as DVD (Digital Versatile Disk) drives or semiconductor memory. While in the present embodiment, SAS is employed as the communication protocol used for data transfer between the SAS controller 250 and the HDDs 270, the protocol herein is not limited to SAS, it being possible to use any communication protocol for peer to peer communication with daisy chain-connected devices, such as the SATA (Serial ATA) protocol for example.

In the example illustrated in FIG. 2, a number "n" (where "n" is a natural number) of expanders 260 are series-connected in a row to the SAS controller 250. To each of these expanders 260 is respectively connected one HDD 270, whereby a total of "n" HDDs 270 are connected to the SAS controller 250 in a daisy chain arrangement. In the example shown in FIG. 2, a single HDD 270 is connected to each single expander 260; however, in alternative embodiments, multiple HDDs 270 could be connected to a single expander 260, or expanders 260 having no HDDs 270 connected directly thereto could be present as well. The definition with regard to symbols assigned to expanders herein will be to label them in order starting from the one closest to the SAS controller 250 as expander 260-1, 260-2, 260-3, . . . 260-n when specifying their positional relationship to the SAS controller 250; however, where they are referred to collectively without specifying location from the SAS controller 250, they will be denoted simply as expanders 260. The definition with regard to symbols assigned to HDDs herein will be to label them in order starting from the one closest to the SAS controller 250 as HDD 270-1, 270-2, 270-3, . . . 270-n when specifying their positional relationship to the SAS controller 250; however, where they are referred to collectively without specifying location from the SAS controller 250, they will be denoted simply as HDDs 270.

The storage system 20 further includes a host interface 220, a switch 230, a disk interface 240, a management interface 218, and a main control unit 210. The host interface 220 of the storage system 20 connects the host computers 30 with the storage network 40 so as to enable data exchange between them; and upon receiving an access request, such as a write or read request, from a host computer 30, will send the host computer 30 a response to the request. The switch 230 of the storage system 20 is used to switch the data transfer pathway between the host interface 220 and the disk interface 240. The disk interface 240 of the storage system 20 includes the SAS controller 250 mentioned previously, and in accordance with commands received through the host interface 220 will control through the SAS controller 250 the reading and writing of data to and from the HDDs 270. In the present embodiment, in order to ensure smooth exchange of data being transferred from a host computer 30 on the basis of an access request, the host interface 220, the switch 230, and the disk interface 240 are each equipped with cache memory (not shown) for temporary storage of data in transit. The management interface 218 of the storage system 20 is connected with the management network 50 so as to enable data exchange between them.

In order to processes reading and writing of data in response to access requests from host computers 30, the main control unit 210 of the storage system 20 will individually control the host interface 220, the switch 230, and the disk interface 240 in accordance with instruction information or settings information from the storage management device 60. The main control unit 210 includes an LU management module 810, a target designating module 830, a destination selecting module 850, and a data migrating module 860. The LU management module 810 of the main control unit 210 manages the memory areas of the plurality of HDDs 270 in terms of a plurality of logical units (herein also termed "LU"). In the present embodiment, the LU management module 810 manages the plurality of HDDs 270 using RAID (Redundant Arrays of Independent (Inexpensive) Disks) technology.

The target designating module 830, the destination selecting module 850, and the data migrating module 860 of the main control unit 210 execute processes to function as a path adjusting unit for adjusting the number of expanders 260 which will serve as data transfer pathways between the SAS controller 250 and the HDDs 270. The target designating module 830 constituting part of this path adjusting unit will specify data targeted for adjustment, from among the data stored in the plurality of HDDs 270. The destination selecting module 850 constituting part of this path adjusting unit will select from among the plurality of HDDs 270-1 to 270-n an HDD 270 in which to store the data specified by the target designating module 830, in such a way as to reduce the number of expanders 260 on the data transfer pathway. In the present embodiment, data specified by the target designating module 830 will be selected using units of the logical units under management by the LU management module 810; in the event that a logical unit specified by the target designating module 830 is composed of multiple HDDs 270 the destination selecting module 850 will select multiple HDDs 270 having a total memory area of sufficient size to make up the logical unit, as the HDDs 270 in which to store the data in the logical unit. The data migrating module 860 constituting part of the path adjusting unit will then migrate the data which have been specified by the target designating unit to the HDD(s) 270 selected by the destination selecting module 850. In the present embodiment, data migration refers to copying data to the destination memory area, and deleting data from the migration source memory area.

In the present embodiment, the main control unit 210 includes a CPU 212 and a memory 214. In the embodiment, the functions of the LU management module 810, the target designating module 830, the destination selecting module 850, and the data migrating module 860 will be carried out through execution of operation processes by the CPU 212 on the basis of software. In alternative embodiments, at least some of the functions of the LU management module 810, the target designating module 830, the destination selecting module 850, and the data migrating module 860 may be carried out through operation of the electronic circuits of the main control unit 210 based on their physical circuit configuration. The operations of the main control unit 210 will be discussed in detail later.

An LU management table 910, a requested performance table 920, and performance matching data 930 are stored in the memory 214 of the main control unit 210.

FIG. 3 is an illustration depicting the LU management table 910 in Embodiment 1. The LU management table 910 represents data containing information that indicates relationships among the logical units managed by the LU management module 810, the expanders 260, and the HDDs 270. In the present embodiment, the LU management table 910 will be updated in the event of changes in logical unit configuration or in the connection configuration of the HDDs 270. Updating of the LU management table 910 will be discussed in more detail later.

The LU management table 910 contains LU identification symbols 9110, HDD identification symbols 9120, and expander stage numbers 9130. The LU identification symbols 9110 in the LU management table 910 represent data individually identifying the logical units under management by the LU management module 810. The HDD identification symbols 9120 in the LU management table 910 represent data identifying the HDD 270 on which the logical unit corresponding to the LU identification symbol 9110 has been created. The expander stage number 9130 in the LU management table 910 represents data indicating the number of expanders 260 on the data transfer pathway between the SAS controller 250 and the logical unit corresponding to the LU identification symbol 9110. Specifically, the expander stage number 9130 represents data indicating the number of expanders 260 on the data transfer pathway between the SAS controller 250 and the HDD 270 which makes up the logical unit.

In the example of FIG. 3, the logical unit identified by the LU identification symbol "LU0" has been created on the HDD 270-2 which is identified by the HDD identification symbol "HDD2," and the number of expanders on the pathway is indicated as being "2." The logical unit identified by the LU identification symbol "LU1" has been created on the HDD 270-5 which is identified by the HDD identification symbol "HDD5," and the number of expanders on the pathway is indicated as being "5." The logical unit identified by the LU identification symbol "LU2" has been created on the HDD 270-3 which is identified by the HDD identification symbol "HDD3," and the number of expanders on the pathway is indicated as being "3." The logical unit identified by the LU identification symbol "LU3" has been created on the HDD 270-4 which is identified by the HDD identification symbol "HDD4," and the number of expanders on the pathway is indicated as being "4." In the example of FIG. 3, no logical unit has been created on the HDD 270-1 which is identified by the HDD identification symbol "HDD1," and for which the expander stage number is "1."

FIG. 4 is an illustration showing the requested performance table 920 of the main control unit 210. The requested performance table 920 represents data containing information that indicates requested performance requested performance of logical units under management by the LU management module 810. In the present embodiment, the requested performance table 920 is saved in the main control unit 210 through an operation performed on the storage management device 60 by the administrator of the storage system 20. The requested performance table 920 contains entries for LU identification symbols 9210 and requested performance 9220. In the requested performance table 920 the LU identification symbols 9210 represent data individually identifying logical units under management by the LU management module 810. In the requested performance table 920, requested performance 9220 represents data indicating the requested performance of the logical units corresponding to the LU identification symbols 9210; in the present embodiment, this data indicates the requested data transfer rate for transfer of the data of the logical unit from the HDD 270 to the SAS controller 250. In the example of FIG. 4, the logical unit identified by the LU identification symbol "LU0" is shown as requiring a data transfer rate of 800 megabits per second (hereinafter denoted "MB/s"). The logical unit identified by the LU identification symbol "LU1" is shown as requiring a data transfer rate of 500 MB/s. The logical units identified by the LU identification symbols "LU2" and "LU3" are shown as requiring a data transfer rate of 300 MB/s.

Figure 5:
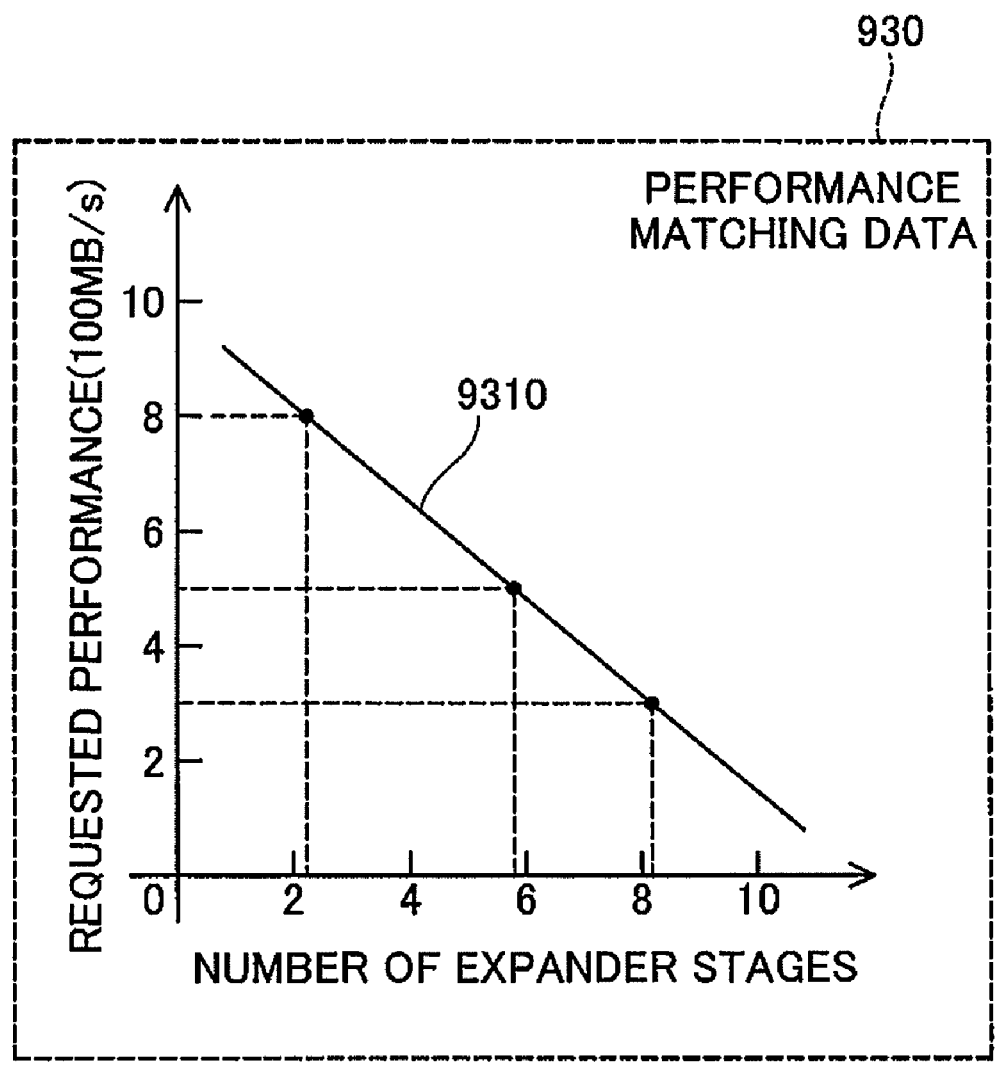
FIG. 5 shows an illustration showing performance matching data of a main control unit.

FIG. 5 is an illustration showing the performance matching data 930 of the main control unit 210. The performance matching data 930 is data which indicate expander stage numbers at which it will be possible to provide the requested performance indicated in the requested performance table 920. In the present embodiment, the performance matching data 930 is saved in the main control unit 210 through an operation performed on the storage management device 60 by the administrator of the storage system 20. The example of FIG. 5 shows that if the expander stage number is "2" or fewer it will be possible to provide requested performance of 800 MB/s. If the expander stage number is "5" or fewer it will be possible to provide requested performance of 500 MB/s, and if the expander stage number is "8" or fewer it will be possible to provide requested performance of 300 MB/s.

Figure 6:
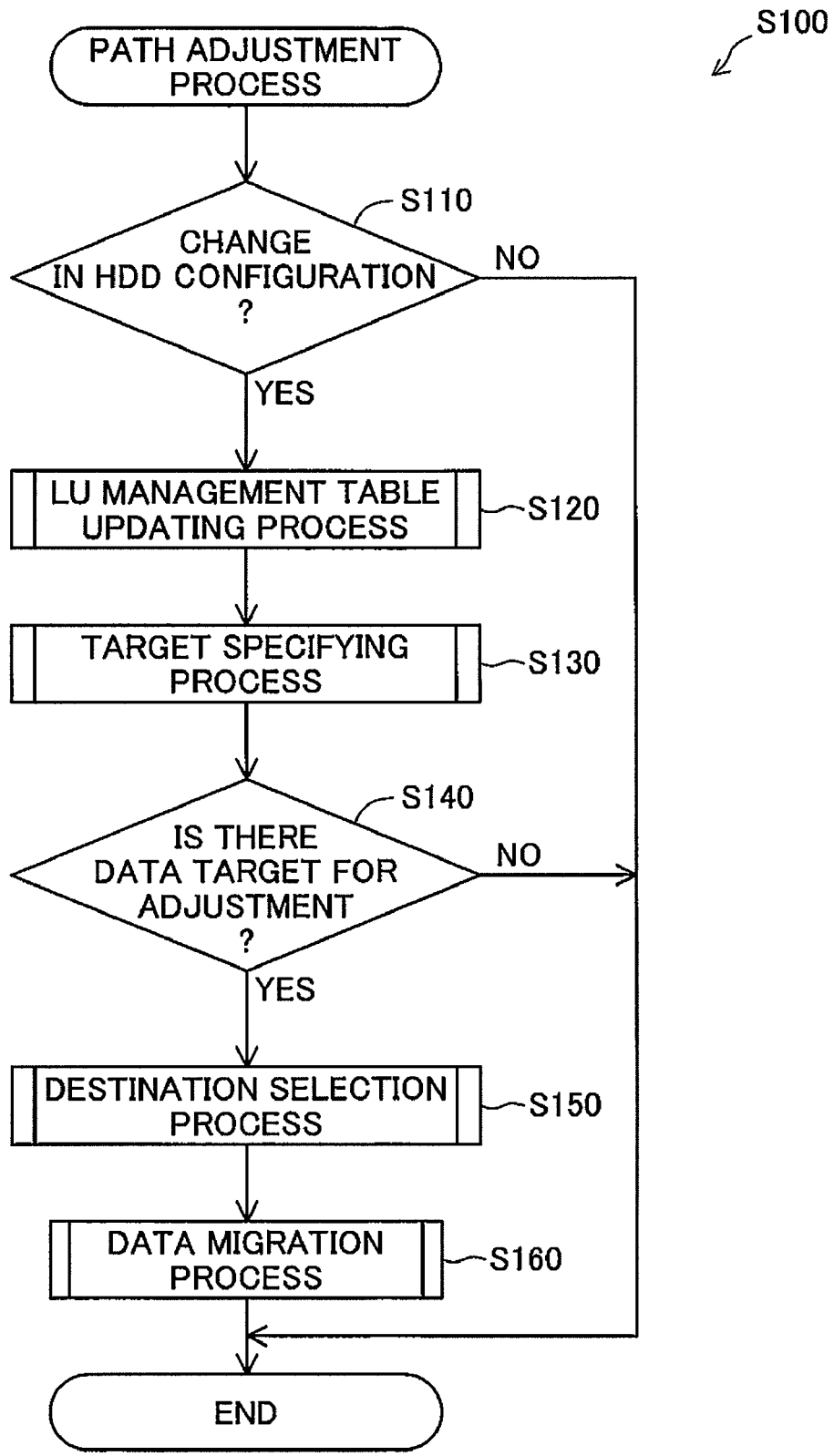
FIG. 6 shows a flowchart of a path adjustment process executed by the main control unit of the storage system in Embodiment 1.

A2. Computer System Operation:

FIG. 6 is a flowchart of a path adjustment process (Step S100) executed by the main control unit 210 of the storage system 20 in Embodiment 1. In the present embodiment, the main control unit 210 of the storage system 20 will periodically execute the path adjustment process (Step S100) of FIG. 6. In the embodiment, the path adjustment process (Step S100) of FIG. 6 is carried out through operation of the CPU 212 of the main control unit 210 on the basis of software, but in an alternative embodiment could instead be carried out through operation of the electronic circuits of the main control unit 210 based on the physical circuit configuration.

When the path adjustment process (Step S100) of FIG. 6 is initiated, the main control unit 210 of the storage system 20 will determine whether there has been any change in the HDD 270 connection configuration in association with additional installation, redeployment, or removal of the SAS controller 250, any of the expanders 260, or any of the HDDs 270 (Step S110). In the present embodiment, the main control unit 210 will query the SAS controller 250 as to the HDD 270 connection configuration in order to determine whether there has been any change in the HDD 270 connection configuration (Step S110). In the event there has been a change in the HDD 270 connection configuration (Step S110), the main control unit 210 will execute an LU management table updating process (Step S120). In the LU management table updating process (Step S120), the main control unit 210 will make appropriate changes in the LU management table 910 to reflect the changes in the HDD 270 connection configuration.

Figure 7:
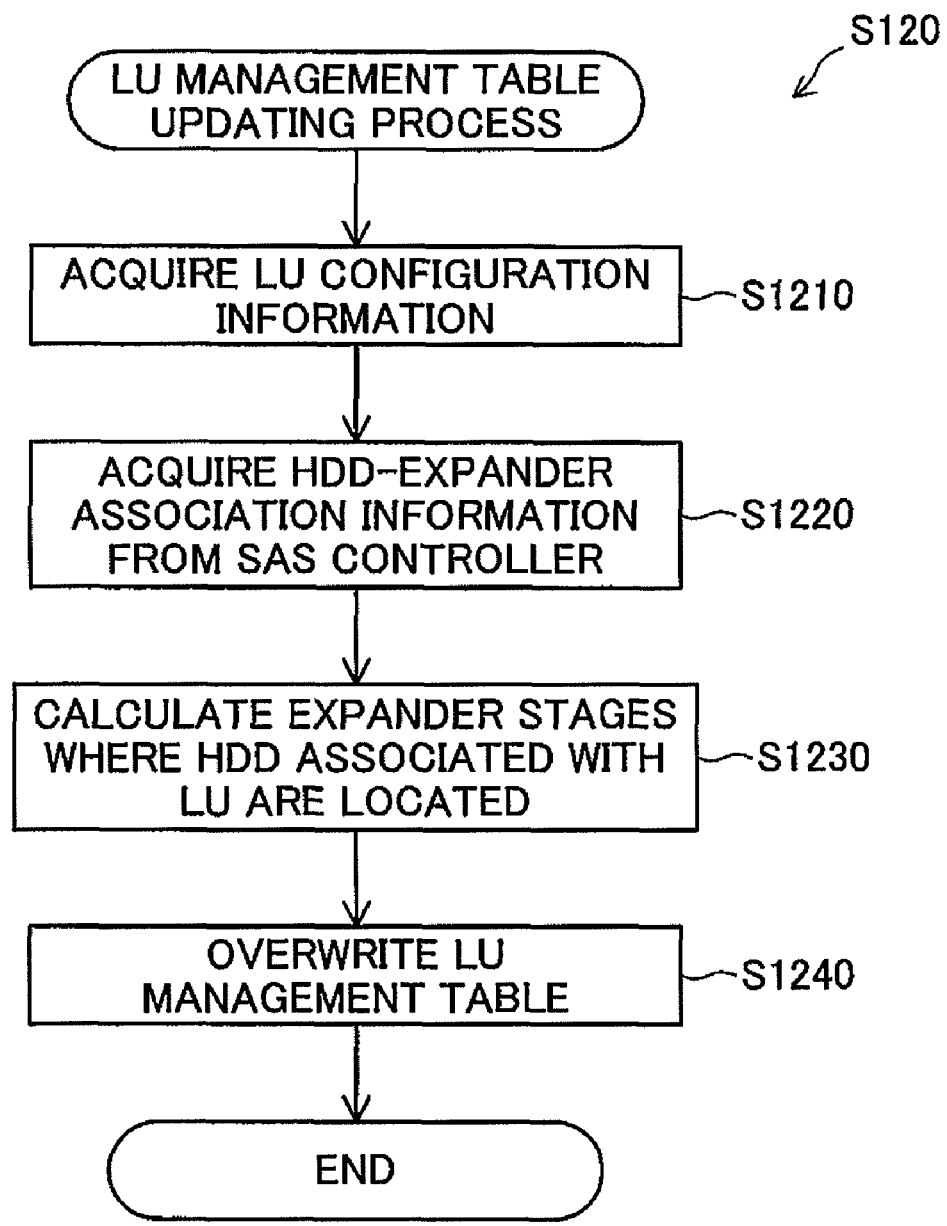
FIG. 7 shows a flowchart depicting the specifics of an LU management table updating process in FIG. 6.

FIG. 7 is a flowchart depicting the specifics of the LU management table updating process (Step S120) in FIG. 6. When the LU management table updating process (Step S120) of FIG. 7 is initiated, the main control unit 210 will acquire, from the storage management device 60, configuration information that indicates logical unit configuration in the plurality of HDD 270 (Step S1210). Subsequently, the main control unit 210 will acquire from the SAS controller 250 association information that indicates associations between HDDs 270 and expanders 260 (Step S1220). Then, on the basis of the logical unit configuration information acquired from the storage management device 60 and the HDD 270-expander 260 association information acquired from the SAS controller 250, the main control unit 210 will calculate the expander stage at which the HDD 270 associated with the logical unit is located (Step S1230). The main control unit 210 will then modify the LU management table 910 on the basis of the calculated expander stage (Step S1240). After modifying the LU management table 910, the main control unit 210 will terminate the LU management table updating process (Step S110).

Returning now to discussion in FIG. 6, subsequent to the LU management table updating process (Step S120), the main control unit 210 of the storage system 20, by operating as a target designating module 830, will execute a target specifying process (Step S130). In the target specifying process (Step S130), the main control unit 210 will specify, from among the data stored in the plurality of HDDs 270, that data which are to be targeted for adjustment. In the present embodiment, the data specified in the target specifying process (Step S130) will be specified using units of logical units under management by the LU management module 810; however, in an alternative embodiment, data could be specified using units of files within logical units.

Figure 8:
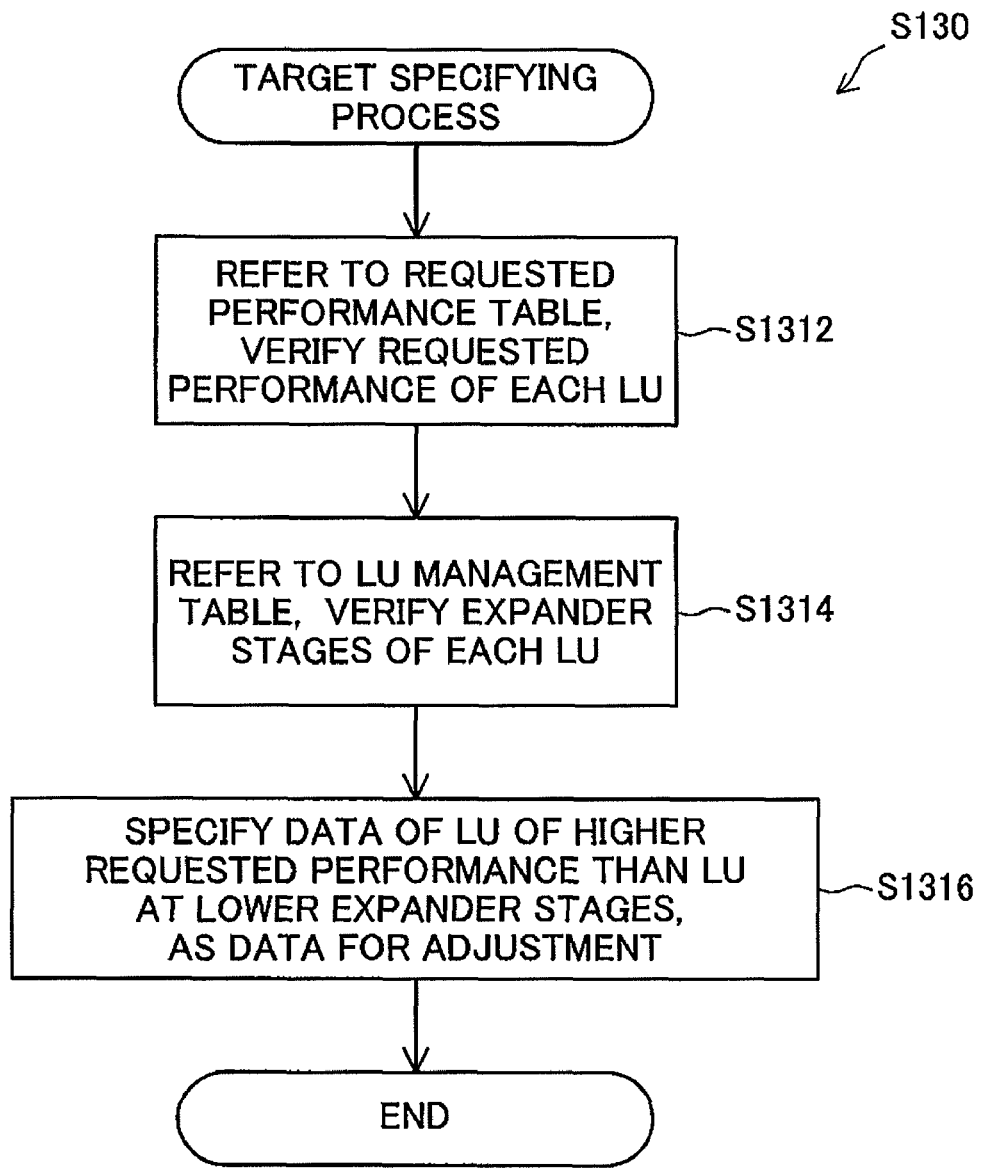
FIG. 8 shows a flowchart depicting the specifics of a target specifying process in FIG. 6.

FIG. 8 is a flowchart depicting the specifics of the target specifying process (Step S130) in FIG. 6. When the target specifying process (Step S130) of FIG. 8 is initiated, the main control unit 210 will look up in the requested performance table 920 stored in the memory 214 and verify the requested performance requested of the individual logical units (Step S1312). The main control unit 210 will then look up in the LU management table 910 stored in the memory 214 and verify the expander stage number at the location of the individual logical units (Step S1314). Subsequently, the main control unit 210 will specify, as the data for adjustment, that data which are stored in a logical unit whose requested performance is higher than for other logical units at lower expander stages (Step S1316). In the exemplary LU management table 910 of FIG. 3 and the requested performance table 920 of FIG. 4, the logical unit "LU1" at expander stage "5" has requested performance of "500 MB/s" whereas the logical unit "LU2" at expander stage "3" and the logical unit "LU3" at expander stage "4" have requested performance of "300 MB/s." Consequently, under the conditions shown in FIG. 3 and 4, in the target specifying process (Step S130), data in the logical unit "LU1" would be specified as the data for adjustment. After data targeted for adjustment has been specified (Step S1316), the main control unit 210 will terminate the target specifying process (Step S130).

Returning to discussion in FIG. 6, if in the identification process (Step S130) data targeted for adjustment has not been specified (Step S140: NO), in the event that notwithstanding a change in the HDD 270 connection configuration associated for example with additional installation, redeployment, or removal of the SAS controller 250, any of the expanders 260, or any of the HDDs 270, it is possible nevertheless for relationships between expander stage number and requested performance for logical units to be maintained, in such a case the main control unit 210 of the storage system 20 will decide that there is no data targeted for adjustment, i.e. that data targeted for adjustment was not specified, and will then terminate the path adjustment process (Step S100). If on the other hand in the identification process (Step S130) data targeted for adjustment has been specified (Step S140: YES), the main control unit 210 of the storage system 20 will now operate as the destination selecting module 850 in order to execute the destination selection process (Step S150). In the destination selection process (Step S150), the main control unit 210 will select from among the plurality of HDDs 270 an HDD in which to store the data targeted for adjustment, in such a way as the reduce the number of expanders on the data transfer pathway of the data targeted for adjustment which was specified in the target specifying process (Step S130).

Figure 9:
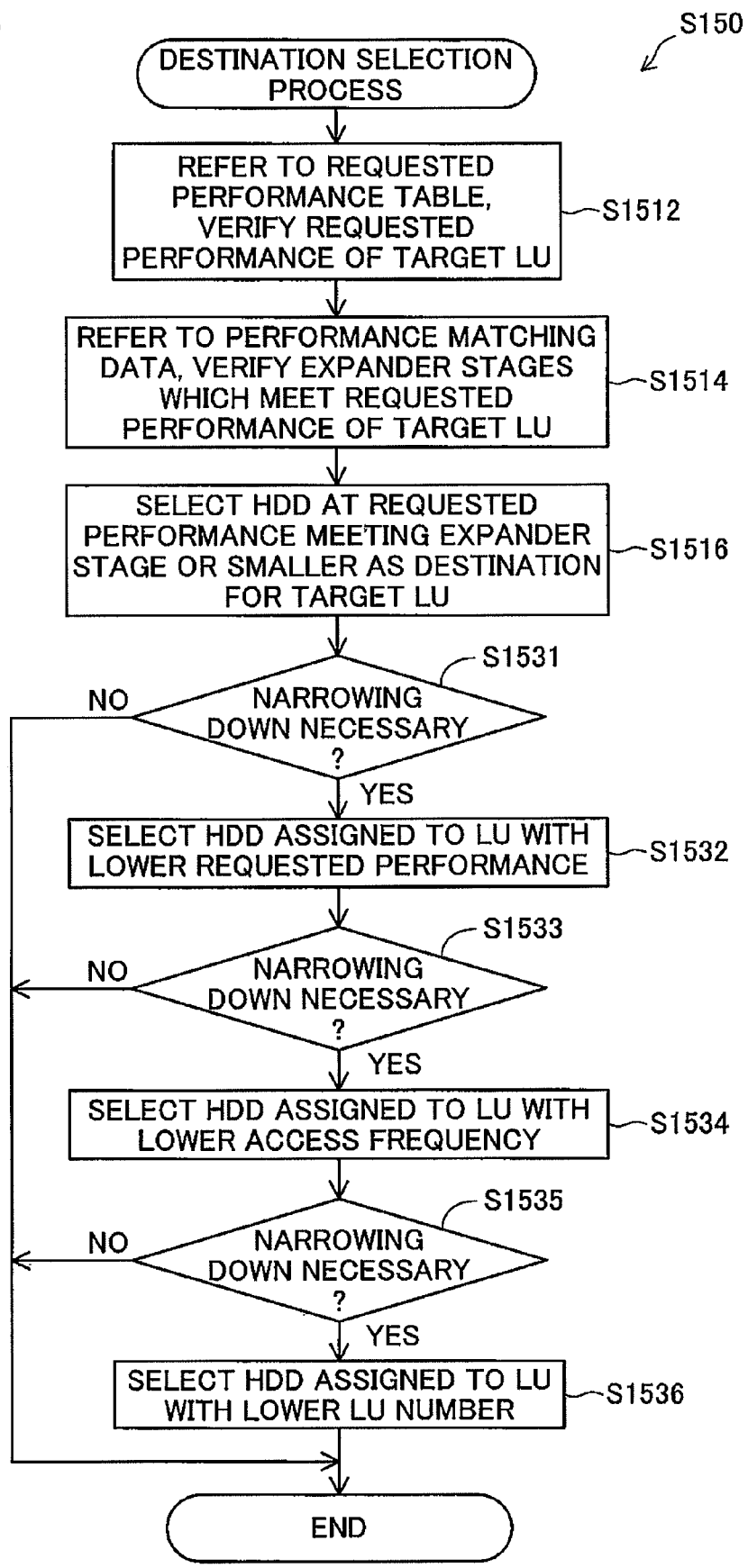
FIG. 9 shows a flowchart depicting the specifics of a destination selection process in FIG. 6

FIG. 9 is a flowchart depicting the specifics of the destination selection process (Step S150) in FIG. 6. When the destination selection process (Step S150) of FIG. 9 is initiated, the main control unit 210 will look up in the requested performance table 920 stored in the memory 214 and verify the requested performance requested of the logical unit which was specified as the data for adjustment (Step S1512). The main control unit 210 will then refer to the performance matching data 930 stored in the memory 214 and verify which expander stages will afford the requested performance of the data targeted for adjustment (Step S1514). Subsequently, the main control unit 210 will select an HDD 270 at an expander stage equal to or less than that affording the requested performance, as the destination for the data targeted for adjustment (Step S1516).

In the present embodiment, in the preceding target specifying process (Step S130), the data in the logical unit "LU1" was specified as the data for adjustment. Consequently, in the destination selection process (Step S150), on the basis of the requested performance table 920 of FIG. 4 it will be verified that the requested performance of the logical unit "LU1" is "500 MB/s" (Step S1512). Subsequently, on the basis of the performance matching data 930 of FIG. 5, it will be verified that the expander stage affording the requested performance is "5" or less (Step S1514). Consequently, under the conditions depicted in FIGS. 4 and 5, in the destination selection process (Step S150) the five HDDs 270-1 to 270-5 at expander stages of "5" or less will be selected as destinations (Step S1516).

Once destinations for the data targeted for adjustment have been selected (Step S1516), in the event that a plurality of HDDs 270 have been selected as destinations, and the total storage capacity of these HDDs 270 exceeds the total storage volume of the data targeted for adjustment, the main control unit 210 will determine whether it is necessary to narrow down the destination for the data targeted for adjustment (Step S1531). In the event that it is necessary to narrow down the destination for the data targeted for adjustment (Step S1531, YES), the main control unit 210 will refer to the LU management table 910 and the requested performance table 920, and from among the HDDs 270 at expander stages equal to or less than that affording the requested performance, will narrow down the destination to those HDDs 270 assigned to logical units with lower requested performance (Step S1532).

The main control unit 210 will then determine whether it is necessary to further narrow down the destination for the data targeted for adjustment (Step S1533). In the event that it is necessary to further narrow down the destination for the data targeted for adjustment (Step S1533, YES), the main control unit 210 will refer to the access logs in the individual HDDs 270 under management by the SAS controller 250, and from among the HDDs 270 at expander stages equal to or less than that affording the requested performance and having lower requested performance, will narrow down the destination to HDDs 270 assigned to logical units accessed with lower frequency (Step S1534).

The main control unit 210 will then determine whether it is necessary to still further narrow down the destination for the data targeted for adjustment (Step S1535). In the event that it is necessary to further narrow down the destination for the data targeted for adjustment (Step S1535, YES), the main control unit 210 will refer to the LU management table 910, and from among the HDDs 270 at expander stages equal to or less than that affording the requested performance, and having lower requested performance and frequency of access, will narrow down the destinations to HDDs 270 assigned to logical units with smaller LU identification symbols 9110 (Step S1536).

After narrowing down the destination to the HDDs 270 of logical units with smaller logical unit numbers (Step S1536), the main control unit 210 will terminate the destination selection process (Step S150). The main control unit 210 will also terminate the destination selection process (Step S150) in the event it is not necessary to narrow down the destination (Steps S1531, S1533 and S1535).

Returning to discussion in FIG. 6, subsequent to the destination selection process (Step S150), the main control unit 210 of the storage system 20 will operate as the data migrating module 860 in order to execute the data migration process (Step S160). In the data migration process (Step S160), the main control unit 210 will move the data of the logical unit, namely, the data targeted for adjustment which was specified in the target specifying process (Step S130), to the HDD 270 which was selected in the destination selection process (Step S150).

Figure 10:
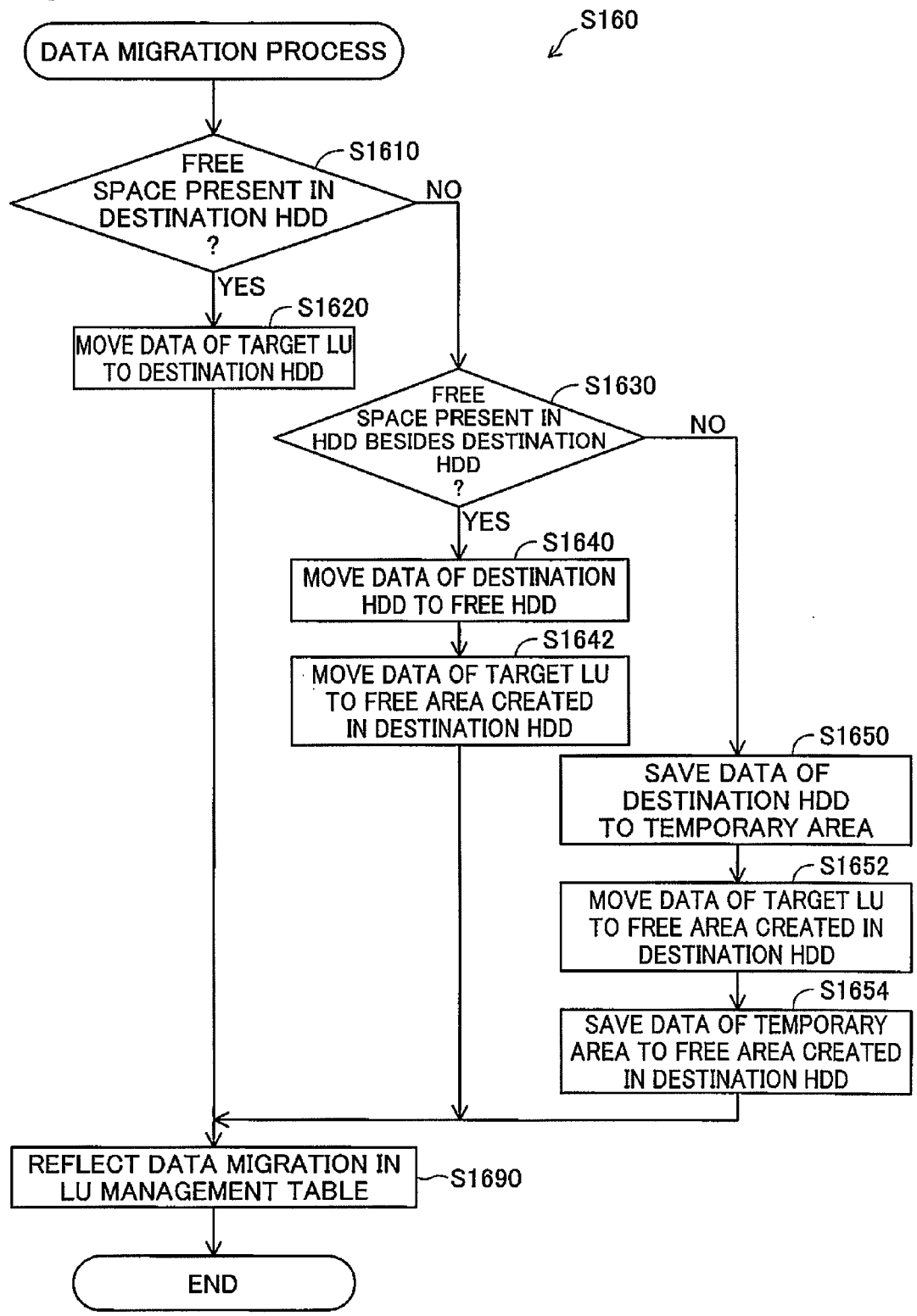
FIG. 10 shows a flowchart depicting the specifics of a data migration process in FIG. 6.

FIG. 10 is a flowchart depicting the specifics of the data migration process (Step S160) in FIG. 6. When the data migration process (Step S160) of FIG. 10 is initiated, the main control unit 210 will decide whether the memory area of the HDD 270 which was selected in the destination selection process (Step S150) has free space equivalent to the amount of data targeted for adjustment (Step S1610). In the event there is sufficient free space in the HDD 270 selected as the destination (Step S1610), the main control unit 210 will move the data of the logical unit, namely, the data which were targeted for adjustment specified in the target specifying process (Step S130), to the free area in the HDD 270 which has been selected as the destination (Step S1620). In the present embodiment, the data targeted for adjustment is saved to the free space in the HDD 270 at the smallest expander stage number among the free space in HDDs 270 selected as destinations, but in an alternative embodiment the data could instead be saved to the free space in the HDD 270 at the largest expander stage number, or saved to a free space which has been established according to some other relationship with the data targeted for adjustment.

In the event that there is not sufficient free space in the HDD 270 which has been selected as the destination (Step S1610), the main control unit 210 will then decide whether a memory area of an HDD 270 different from the HDD 270 selected as the destination has free space equivalent to the amount of data targeted for adjustment (Step S1630). In the event there is sufficient free space in this HDD 270 different from the HDD 270 selected as the destination (Step S1630), the main control unit 210 will move the data which have already been saved to the HDD 270 selected as the destination, in an amount equal to that of the data targeted for adjustment, to the free space in the HDD 270 different from the HDD 270 selected as the destination (Step S1640). The main control unit 210 will then move the data of the logical unit constituting the data targeted for adjustment to the free space which has been created thusly in the HDD 270 selected as the destination (Step S1642).

In the event that there is not sufficient free space in an HDD 270 different from the HDD 270 selected as the destination (Step S1630), from the data which have already been saved to the HDD 270 selected as the destination the main control unit 210 will save data, in equal amount to that of the data targeted for adjustment, to a temporary area which is part of the memory area (Step S1650). In the present embodiment, a memory area in the memory 214 of the main control unit 210, or a memory area in the cache memory (not shown) for temporary storage of data in transit in the host interface 220, the switch 230, or the disk interface 240, will be used as this temporary area for saving the data. In the present embodiment, of the data which have already been saved to the HDD 270 selected as the destination, data of the logical unit which are accessed with the lowest frequency will be selected as the data to be saved in the temporary area. After the data have been saved in the temporary area (Step S1650), the main control unit 210 will then move the data of the logical unit constituting the data targeted for adjustment, to the free space which has been created thusly in the HDD 270 selected as the destination (Step S1652). Subsequently, the data which were moved from the HDD 270 selected as the destination and which were saved to the temporary area will be stored in the free space created in the migration source of the data targeted for adjustment (Step S1654).

After the data of the logical unit constituting the data targeted for adjustment that were specified in the target specifying process (Step S130) have been moved to the HDD 270 that was selected in the destination selection process (Step S150) (Steps S1620, S1642, S1654), the main control unit 210 will then modify the LU management table 910 to reflect the migration of data in the HDD 270 (Step S1690). The main control unit 210 will then terminate the data migration process (Step S1690), and terminate the path adjustment process (Step S100) of FIG. 6.

A3. Effects:

According to the storage system 20 in Embodiment 1 described above, during the path adjustment process (Step S100), data in the plurality of HDDs 270 will be shifted among the HDDs 270 in such a way as to reduce the number of expanders 260 on the data transfer pathways, whereby latency attributable to the number of expanders 260 on data transfer pathways can be avoided.

Moreover, in the destination selection process (Step S150), the HDD 270 on which data targeted for adjustment will be stored will be selected from among the plurality of HDDs 270 with reference to the data transfer rate requested for the data targeted for adjustment, in such a way as to reduce the number of expanders 260 on the data transfer pathways, whereby data can be migrated to an HDD 270 which is connected to the SAS controller 250 via a number of expanders 260 appropriate to the requested data transfer rate.

Additionally, in the target specifying process (Step S130), of the data which are stored on the plurality of HDDs 270, data whose requested data transfer rate is higher than that of data on other HDDs 270 which are connected to the SAS controller 250 via a smaller number of expanders 260 will be specified as the data for adjustment, whereby data for which the requested data transfer rate is relatively high can be moved to an HDD 270 connected via a smaller number of expanders 260.

Furthermore, in the target specifying process (Step S130), once data targeted for adjustment have been specified in units of the logical units under management by the LU management module 810, in the subsequent data migration process (Step S160) the data targeted for adjustment will be migrated in these units of logical units, making it possible to avoid a complicated logical unit configuration in the storage system 20.

Additionally, in the path adjustment process (Step S100), the data migration process (Step S160) will be carried out response to a change in the HDD 270 connection configuration (Step S110), whereby latency attributable to the number of expanders 260 on data transfer pathways can be avoided, in response to a change in the HDD 270 connection configuration.

A4. Modification Examples:
A4-1. Modification Example a1:

In the embodiment described above, during the target specifying process (Step S130) the main control unit 210 specifies data for which the requested data transfer rate is high as the data for adjustment, but it would be acceptable to instead specify data accessed with high frequency as the data for adjustment.

Figure 11:
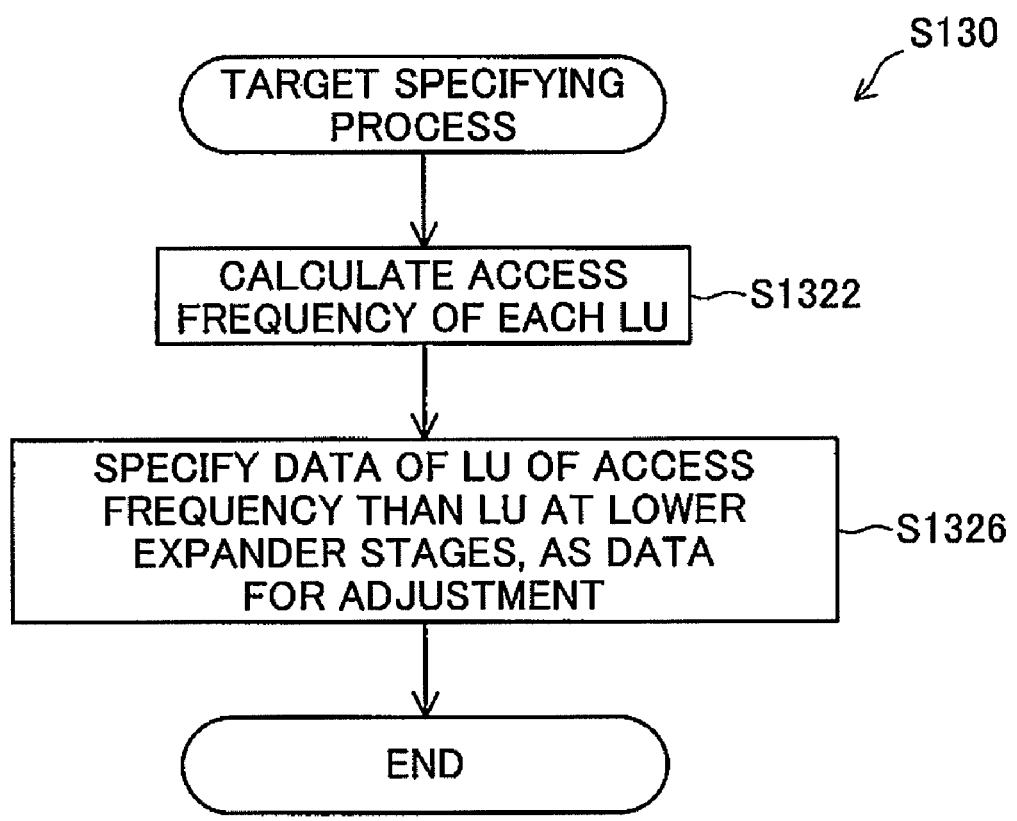
FIG. 11 shows a flowchart depicting the specifics of a target specifying process in Modification Example a1.

FIG. 11 is a flowchart depicting the specifics of the target specifying process (Step S130) in Modification Example a1. In Modification Example a1, during the path adjustment process (Step S100) of FIG. 6, the main control unit 210 of the storage system 20 will execute the target specifying process (Step S130) of FIG. 11 in place of the target specifying process (Step S130) of FIG. 8. When the target specifying process (Step S130) of FIG. 11 is initiated, the main control unit 210 will analyze the access logs of the individual HDDs 270 which are under the management of the SAS controller 250 in order to calculate the frequency of access to the individual logical units under the management of the LU management module 810 (Step S1322). The main control unit 210 will then specify as data targeted for adjustment the data in the logical unit which is accessed with higher frequency than other logical units connected to smaller number of expander stages (Step S1326).

According to the storage system 20 of Modification Example a1, in the target specifying process (Step S130), of data stored on the plurality of HDDs 270, data which is accessed with higher frequency than data in other HDDs 270 connected to the SAS controller 250 via smaller numbers of expanders 260 will be specified as the data for adjustment, whereby data which is accessed with relatively high frequency can be migrated to an HDD 270 connected via a smaller number of expanders 260.

A4-2. Modification Example a2:

In the preceding embodiment, during the target specifying process (Step S130) the main control unit 210 of the storage system 20 specifies high data transfer rate data as the data for adjustment, but it would be acceptable, when the total amount of data being stored in the storage system 20 exceeds a prescribed value, to instead specify data of an HDD 270 connected via a number of expanders 260 which exceeds a prescribed number as the data for adjustment.

Figure 12:
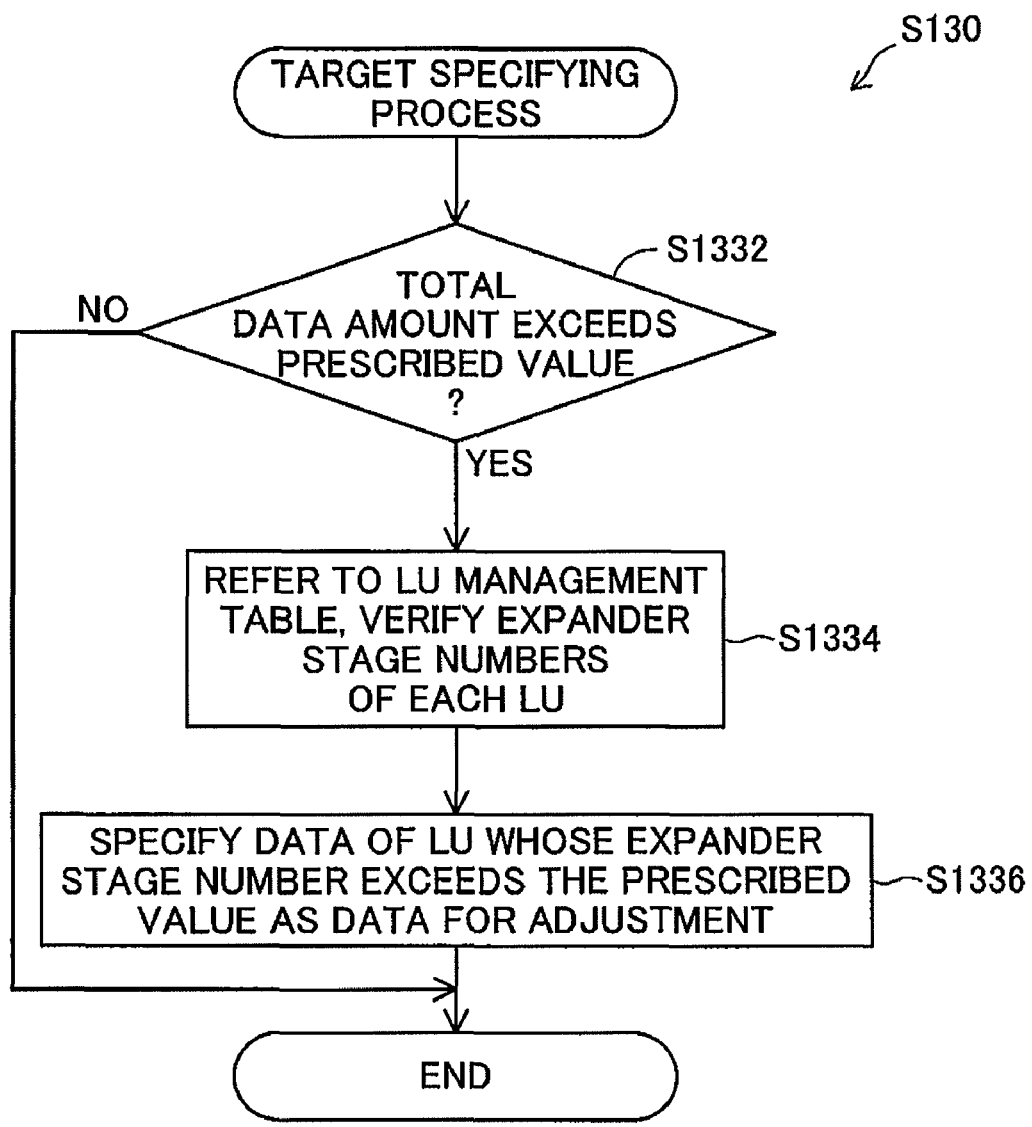
FIG. 12 shows a flowchart depicting the specifics of a target specifying process in Modification Example a2.

FIG. 12 is a flowchart depicting the specifics of the target specifying process (Step S130) in Modification Example a2. In Modification Example a2, during the path adjustment process (Step S100) of FIG. 6, the main control unit 210 of the storage system 20 will execute the target specifying process (Step S130) of FIG. 12 in place of the target specifying process (Step S130) of FIG. 8. When the target specifying process (Step S130) of FIG. 12 is initiated, the main control unit 210 will determine whether the total amount of data being stored in the storage system 20 exceeds a prescribed value (Step S1332). In the present embodiment, the prescribed value for the determination as to the total amount of data being stored in the storage system 20 is an amount of data equivalent to 80% of the total storage capacity at which data can be stored in the storage system 20. In an alternative embodiment, the prescribed value for the determination as to the total amount of data being stored in the storage system 20 could be a value greater than 80% of total storage capacity, or a value less than 80% of total storage capacity; also, the value could be set appropriately with reference to the device configuration and mode of utilization of the storage system 20.

If the total amount of data being stored in the storage system 20 exceeds the prescribed value (Step S1332), the main control unit 210 will refer to the LU management table stored in the memory 214 to verify the expander stage numbers of the individual logical units (Step S1334). The main control unit 210 will then specify data in a logical unit whose expander stage number exceeds a prescribed number as data targeted for adjustment (Step S1336). In the invention, the prescribed number for the logical unit expander stage number determination is the number of the final expander stage in the storage system 20; i.e. where "5" expanders 260 are series-connected, this expander stage number will be "5." In an alternative embodiment, the prescribed number for the logical unit expander stage number determination may be set appropriately with reference to the device configuration and mode of utilization of the storage system 20.

According to the storage system 20 of Modification Example a2, in the event that the amount of data has increased, data stored in an HDD 270 which is connected to relatively downstream expander can be selected as data targeted for improved data transfer rate.

A4-3 Modification Example a3:

In the preceding embodiment, during the target specifying process (Step S130) the main control unit 210 of the storage system 20 specifies high data transfer rate data as the data for adjustment; however, in the case of an increase in the number of expanders 260 it would be acceptable to instead specify data stored in the added expander stage as the data for adjustment.

Figure 13:
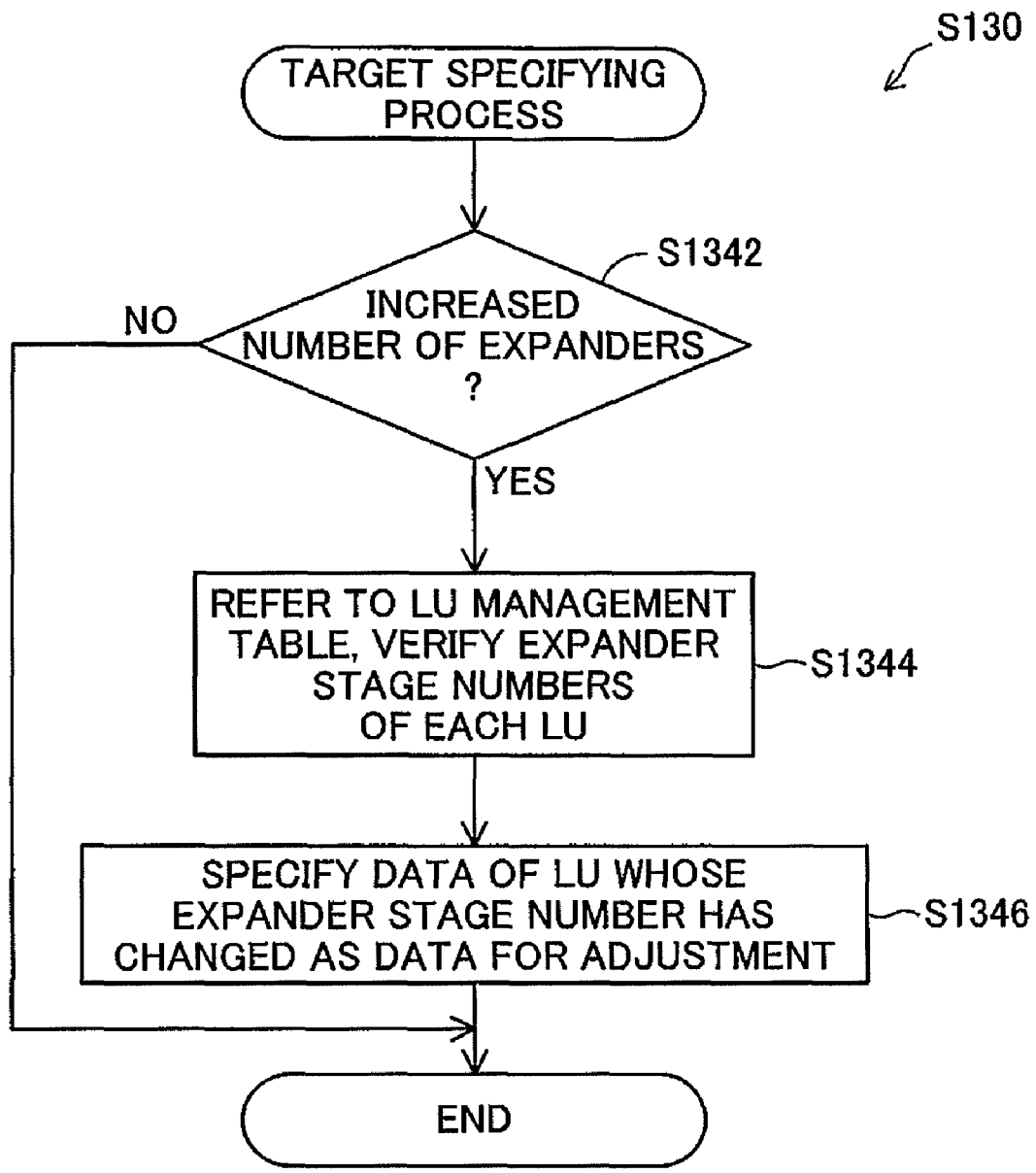
FIG. 13 shows a flowchart depicting the specifics of a target specifying process in Modification Example a3.

FIG. 13 is a flowchart depicting the specifics of the target specifying process (Step S130) in Modification Example a3. In Modification Example a3, during the path adjustment process (Step S100) of FIG. 6 the main control unit 210 of the storage system 20 will execute the target specifying process (Step S130) of FIG. 13 in place of the target specifying process (Step S130) of FIG. 8. When the target specifying process (Step S130) of FIG. 13 is initiated, if an additional expander 260 has been set up (Step S1342), the main control unit 210 will refer to the LU management table stored in the memory 214 to verify the expander stage numbers of the individual logical units (Step S1334). The main control unit 210 will then specify data in a logical unit whose expander stage number has changed with the addition of the expander as the data for adjustment (Step S1346).

According to the storage system 20 of Modification Example a3, data resulting from an increased number of expanders 260 on the data transfer pathway due to an additional expander 260 can be selected as data targeted for improved data transfer rate.

A4-4 Modification Example a4:

In the preceding embodiment, during the target specifying process (Step S130) the main control unit 210 of the storage system 20 specifies high data transfer rate data as the data for adjustment; however it would also be acceptable to specify data accessed in data lengths smaller than a prescribed value as the data for adjustment.

Figure 14:
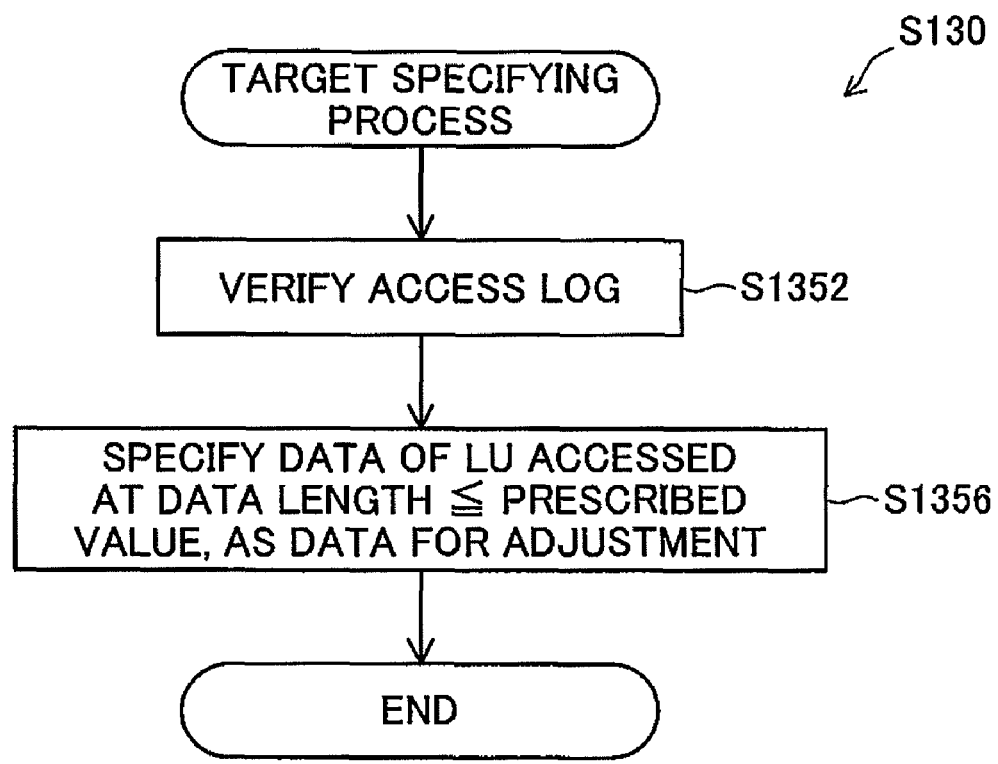
FIG. 14 shows a flowchart depicting the specifics of a target specifying process in Modification Example a4.

FIG. 14 is a flowchart depicting the specifics of the target specifying process (Step S130) in Modification Example a4. In Modification Example a4, during the path adjustment process (Step S100) of FIG. 6, the main control unit 210 of the storage system 20 will execute the target specifying process (Step S130) of FIG. 14 in place of the target specifying process (Step S130) of FIG. 8. When the target specifying process (Step S130) of FIG. 14 is initiated, the main control unit 210 will check the access log in which access to data stored in the plurality of HDDs 270 has been recorded (Step S1352). In the present embodiment, the main control unit 210 will verify the access log which is stored in the memory 214 of the main control unit 210; however, in an alternative embodiment, it could instead query the SAS controller 250 in order to verify the access log maintained by the SAS controller 250. After verifying the access log (Step S1352), on the basis of the access log obtained by querying the SAS controller 250, the main control unit 210 will specify data of logical units accessed in data lengths smaller than a prescribed value as the data for adjustment (Step S1356). In the present embodiment, data specified as data for adjustment will be data which is accessed in data lengths of "2 kilobytes" or smaller; however, in an alternative embodiment the data length may be set appropriately with reference to the device configuration and mode of utilization of the storage system 20.

According to the storage system 20 of Modification Example a4, data which is accessed in data lengths smaller than a prescribed value can be selected as data for which requested data transmission speed is relatively high.

A4-5 Modification Example a5:

In the preceding embodiment, during the target specifying process (Step S130) the main control unit 210 of the storage system 20 specifies high data transfer rate data as the data for adjustment; however it would be acceptable to instead specify randomly accessed data as data for adjustment.

Figure 15:
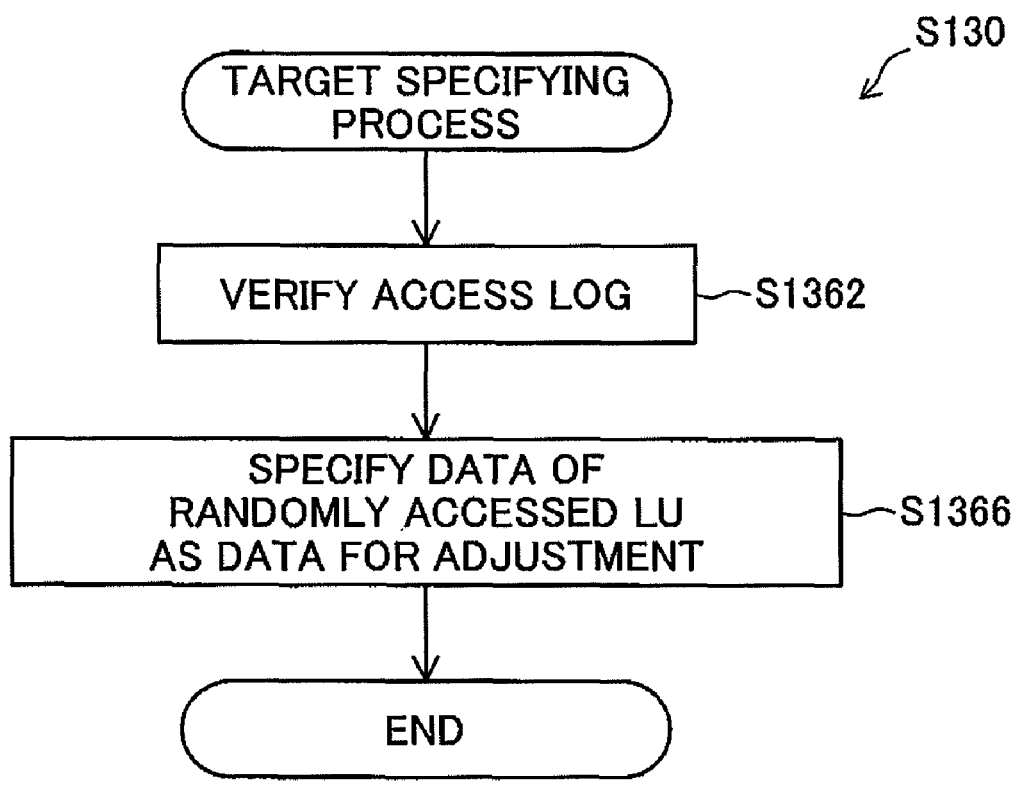
FIG. 15 shows a flowchart depicting the specifics of a target specifying process in Modification Example a5.

FIG. 15 is a flowchart depicting the specifics of the target specifying process (Step S130) in Modification Example a5. In Modification Example a5, during the path adjustment process (Step S100) of FIG. 6, the main control unit 210 of the storage system 20 will execute the target specifying process (Step S130) of FIG. 15 in place of the target specifying process (Step S130) of FIG. 8. When the target specifying process (Step S130) of FIG. 15 is initiated, the main control unit 210 will query the SAS controller 250 in order to verify the access log in which access to data stored in the plurality of HDDs 270 has been recorded (Step S1362). On the basis of the access log obtained by querying the SAS controller 250, the main control unit 210 will then specify data of a randomly accessed logical unit as data for adjustment.

According to the storage system 20 of Modification Example a5, randomly accessed data can be selected as data for which requested data transmission speed is relatively high.

A4-6 Modification Example a6:

In the preceding embodiment, during the path adjustment process (Step S100), the main control unit 210 of the storage system 20 carries out the data migration process (Step S160) in response to a change in the HDD 270 connection configuration (Step S110); however, the data migration process (Step S160) could instead be carried out in response to addition to the network of another host computer 30 which will initiate access to the storage system 20.

Figure 16:
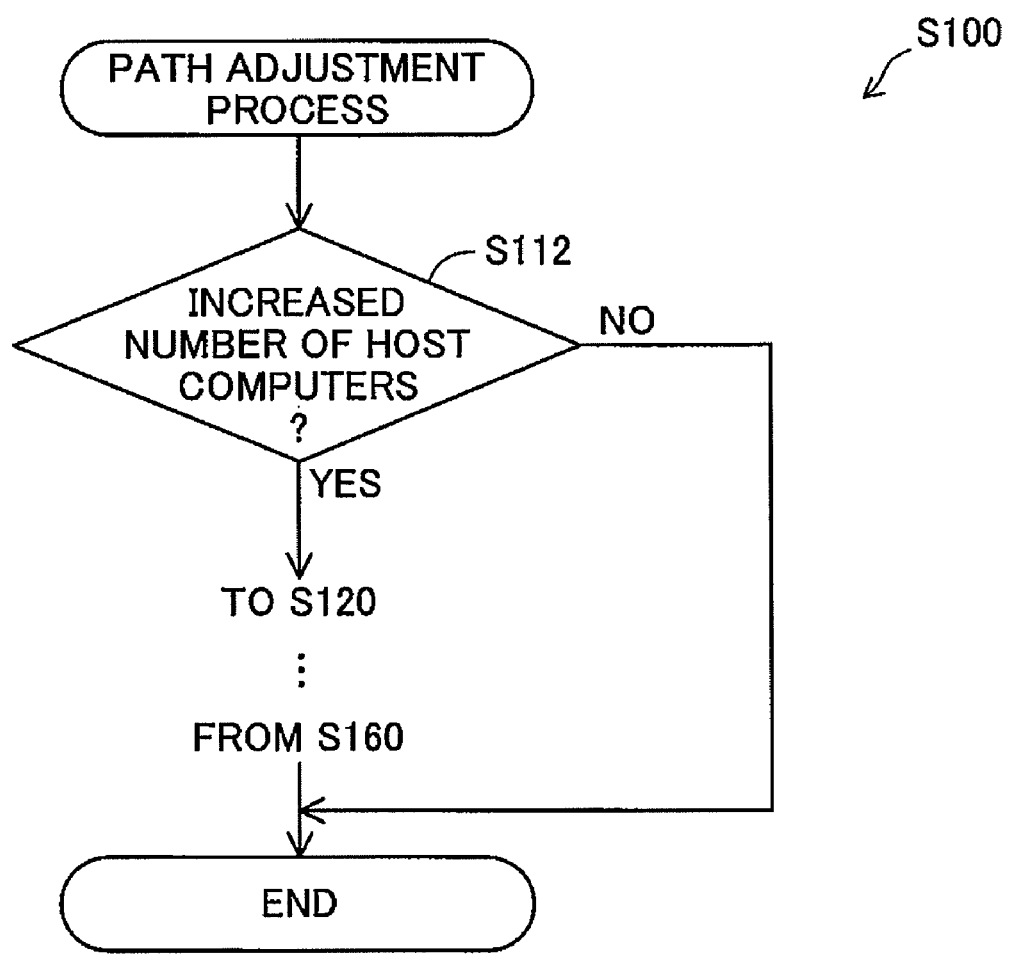
FIG. 16 shows a flowchart depicting a path adjustment process in Modification Example a6.

FIG. 16 is a flowchart depicting the path adjustment process (Step S100) in Modification Example a6. In Modification Example a6, on the basis of information provided by the storage management device 60, the main control unit 210 of the storage system 20 will determine whether a host computer 30 has been added to the network (Step S112). In event that a host computer 30 has been added (Step S112), the main control unit 210 will sequentially execute the management table updating process (Step S120), the target specifying process (Step S130), the destination selection process (Step S150), and the data migration process (Step S160) in the same manner as in the path adjustment process (Step S100) of FIG. 6.

According to the storage system 20 of Modification Example a6, latency attributable to the number of expanders 260 on the data transfer pathway can be avoided in response to an additional host computer 30 which will initiate access.

A4-7 Modification Example a7:

In the preceding embodiment, during the path adjustment process (Step S100), the main control unit 210 of the storage system 20 carries out the data migration process (Step S160) in response to a change in the HDD 270 connection configuration (Step S110); however, the data migration process (Step S160) could instead be carried out in response to a situation where the amount of data stored in the storage system 20 exceeds a prescribed value.

Figure 17:
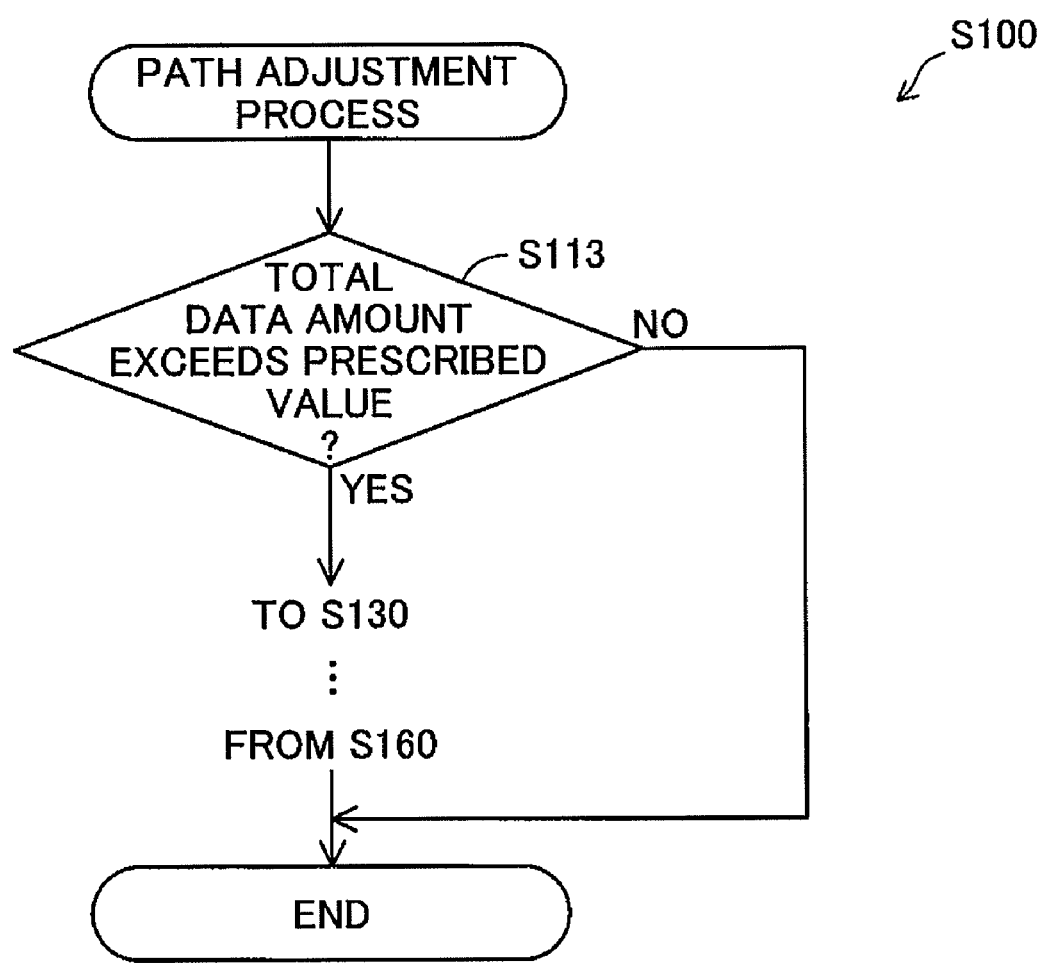
FIG. 17 shows a flowchart depicting a path adjustment process in Modification Example a7.

FIG. 17 is a flowchart depicting the path adjustment process (Step S100) in Modification Example a7. In Modification Example a7, the main control unit 210 of the storage system 20 will determine whether the total amount of data being stored in the storage system 20 exceeds a prescribed value (Step S113). In the present embodiment, the prescribed value for the determination as to the total amount of data being stored in the storage system 20 is an amount of data equivalent to 80% of the total storage capacity at which data can be stored in the storage system 20. In an alternative embodiment, the prescribed value for the determination as to the total amount of data being stored in the storage system 20 could be a value greater than 80% of total storage capacity, or a value less than 80% of total storage capacity; also, the value could be set appropriately with reference to the device configuration and mode of utilization of the storage system 20. In the event that the total amount of data being stored in the storage system 20 exceeds the prescribed value (Step S113), the main control unit 210 will sequentially execute the target specifying process (Step S130), the destination selection process (Step S150), and the data migration process (Step S160) in the same manner as in the path adjustment process (Step S100) of FIG. 6.

According to the storage system 20 of Modification Example a7, latency attributable to the number of expanders 260 on the data transfer pathway can be avoided with reference to the amount of data being stored in the storage system 20.

A4-8 Modification Example a8:

In the preceding embodiment, during the path adjustment process (Step S100), the main control unit 210 of the storage system 20 carries out the data migration process (Step S160) in response to a change in the HDD 270 connection configuration (Step S110); however, the data migration process (Step S160) could instead be carried out in response to a situation where new data has been stored in the storage system 20.

Figure 18:
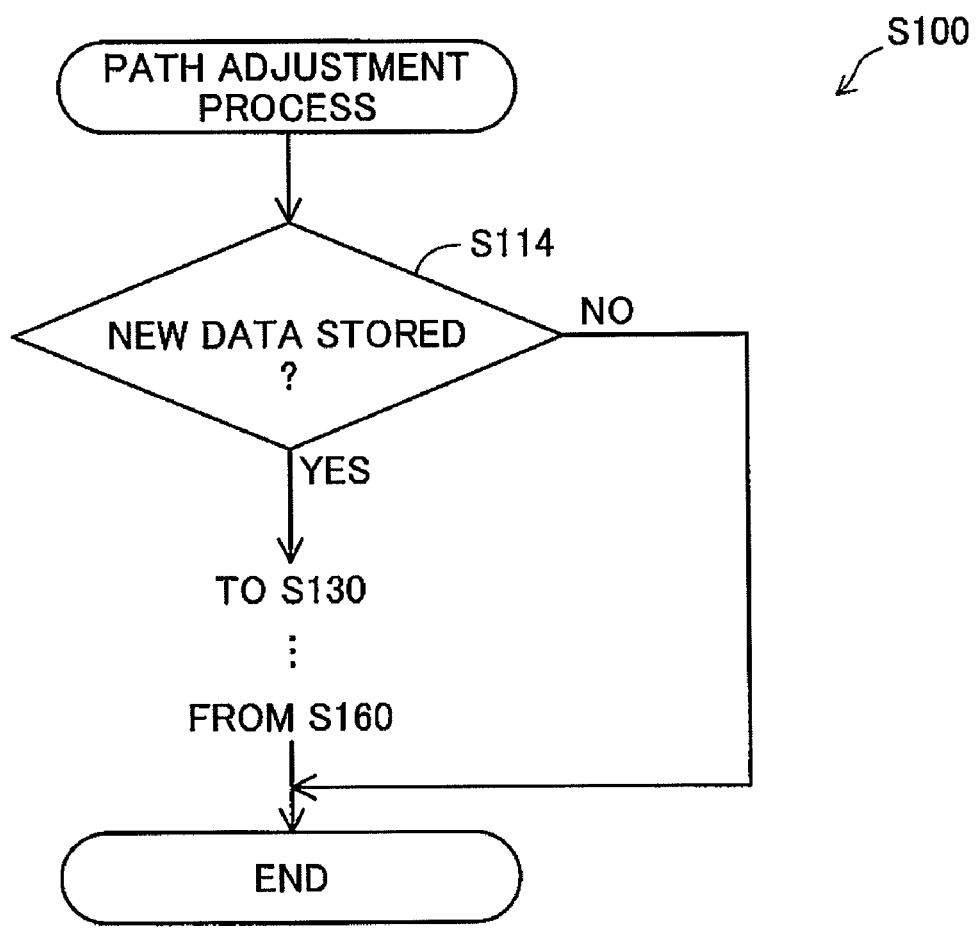
FIG. 18 shows a flowchart depicting a path adjustment process in Modification Example a8.

FIG. 18 is a flowchart depicting the path adjustment process (Step S100) in Modification Example a8. In Modification Example a8, the main control unit 210 of the storage system 20 will determine whether new data has been stored in the storage system 20, on the basis of a data write command sent to the storage system 20 from a host computer 30 (Step S114). In the event that new data has been stored in the storage system 20 (Step S114), the main control unit 210 will sequentially execute the target specifying process (Step S130), the destination selection process (Step S150), and the data migration process (Step S160) in the same manner as in the path adjustment process (Step S100) of FIG. 6.

According to the storage system 20 of Modification Example a8, latency attributable to the number of expanders 260 on the data transfer pathway can be avoided in response to new data being stored in the storage system 20.

A4-9 Modification Example a9:

In the preceding embodiment, during the path adjustment process (Step S100), the main control unit 210 of the storage system 20 would carry out the data migration process (Step S160) in response to a change in the HDD 270 connection configuration (Step S110); however, the data migration process (Step S160) could instead be carried out on a periodic basis.

Figure 19:
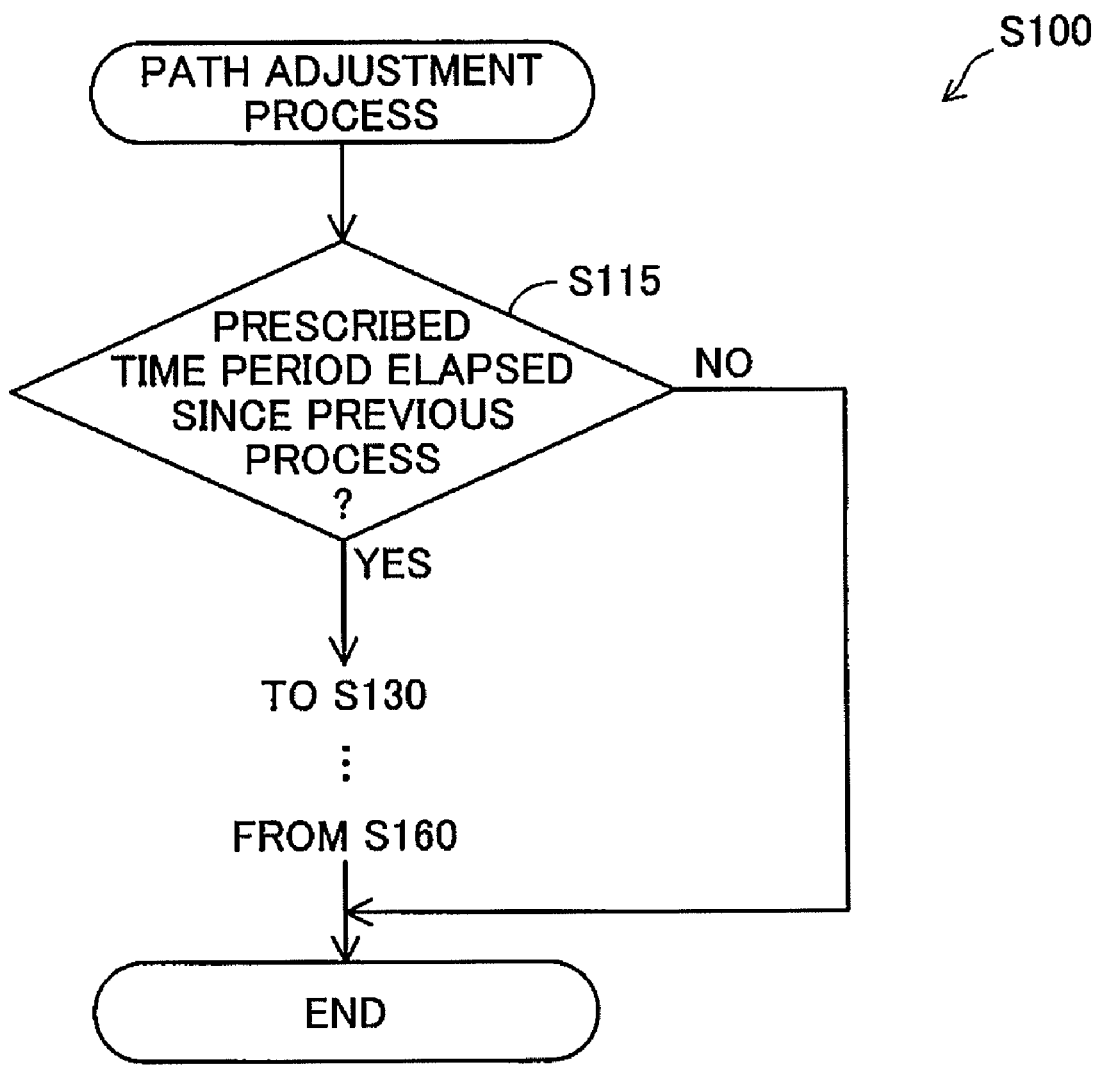
FIG. 19 shows a flowchart depicting a path adjustment process (Step S100) in Modification Example a9.

FIG. 19 is a flowchart depicting the path adjustment process (Step S100) in Modification Example a9. In Modification Example a9, the main control unit 210 of the storage system 20 will determine whether a prescribed period of time has elapsed since the last path adjustment process (Step S100) was executed (Step S115). In the present embodiment, this prescribed period of time has been set to "one month", but in an alternative embodiment could be set appropriately with reference to the device configuration and mode of utilization of the storage system 20. If the prescribed period of time has elapsed since the last path adjustment process (Step S100) was executed (Step S111), the main control unit 210 will sequentially execute the target specifying process (Step S130), the destination selection process (Step S150), and the data migration process (Step S160) in the same manner as in the path adjustment process (Step S100) of FIG. 6.

According to the storage system 20 of Modification Example a9, a process for preventing latency attributable to the number of expanders 260 on the data transfer pathway can be carried out on a periodic basis.

A4-10 Modification Example a10:

In the preceding embodiment, during the destination selection process (Step S110), the main control unit 210 of the storage system 20 selects the destination from among existing HDDs 270, but an additional HDD 270 added to the existing HDDs 270 could be selected as the destination instead.

Figure 20:
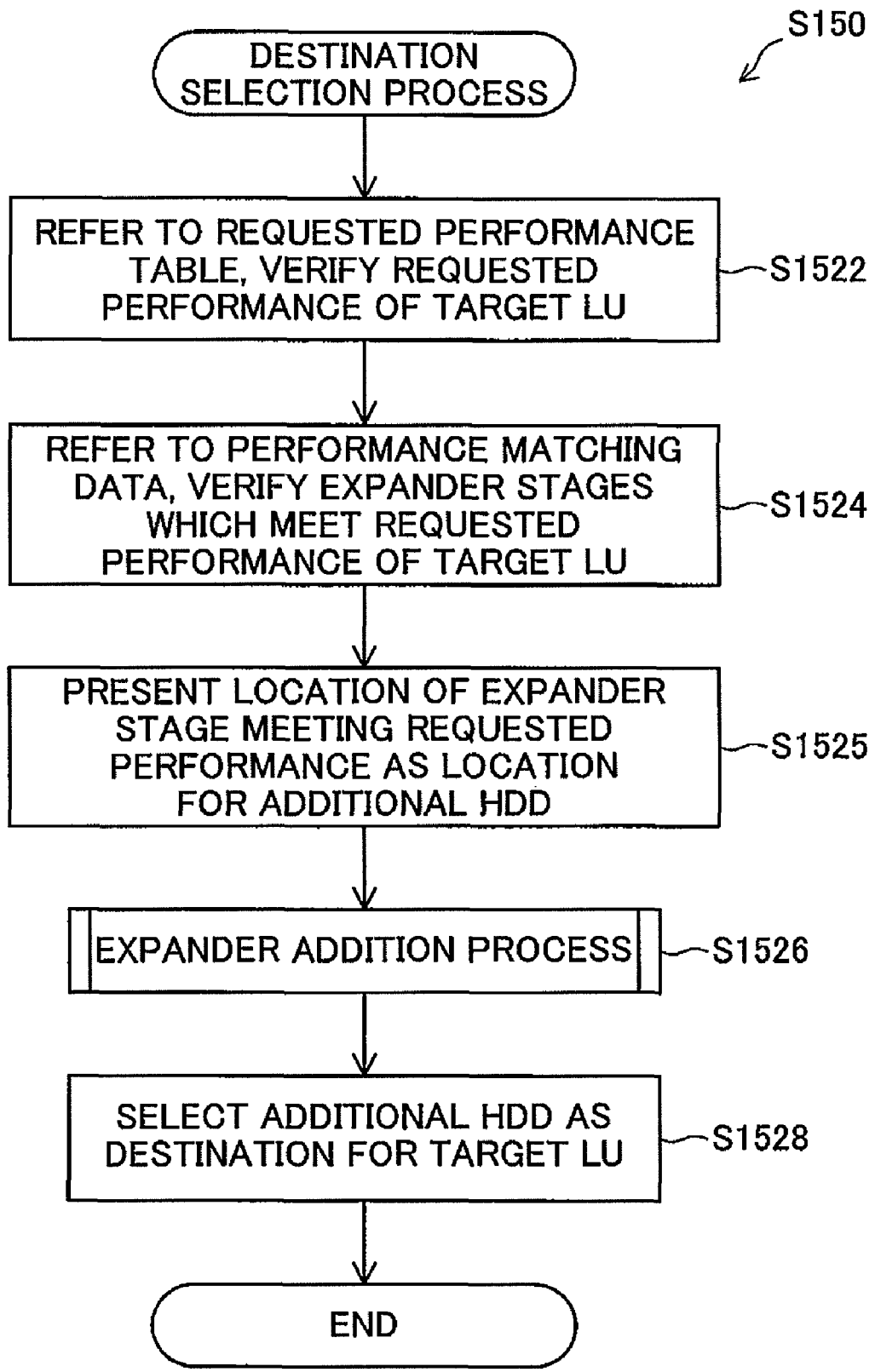
FIG. 20 shows a flowchart depicting the specifics of a destination selection process in Modification Example a10.

FIG. 20 is a flowchart depicting the specifics of the destination selection process (Step S150) in Modification Example a10. In Modification Example a10, during the path adjustment process (Step S1000) of FIG. 6, the main control unit 210 of the storage system 20 will execute the destination selection process (Step S150) of FIG. 20 in place of the destination selection process (Step S150) of FIG. 9. When the destination selection process (Step S150) of FIG. 20 is initiated, the main control unit 210, referring the requested performance table 920 stored in the memory 214, will verify the requested performance requested of the logical unit which has been specified as the data for adjustment (Step S1522). Then, referring to the performance matching data 930 stored in the memory 214, the main control unit 210 will verify the expander stage number satisfying the requested performance of the data for adjustment (Step S1524).

Through the storage management device 60, the main control unit 210 will then present the administrator with a location at an expander stage which will satisfy the requested performance, by way of the location for installation of the additional HDD 270 (Step S1525). After presenting the location for the additional HDD 270 (Step S1525), the main control unit 210 will execute an expander addition process (Step S1526). In the expander addition process (Step S1526), the main control unit 210 will blockade access from the host interface 220 until the storage system 20 administrator has completed installation of the additional HDD 270 at the additional location shown via the storage management device 60. Once the additional HDD 270 has been installed through the expander addition process (Step S1526), the main control unit 210 will then select the additional HDD 270 as the destination for the data for adjustment (Step S1528).

According to the storage system 20 of Modification Example a10, data can be migrated to an HDD 270 which is connected to the control unit by a number of expanders appropriate to the requested data transfer rate, even in cases where the memory area in the storage system 20 is insufficient.

Figure 21:
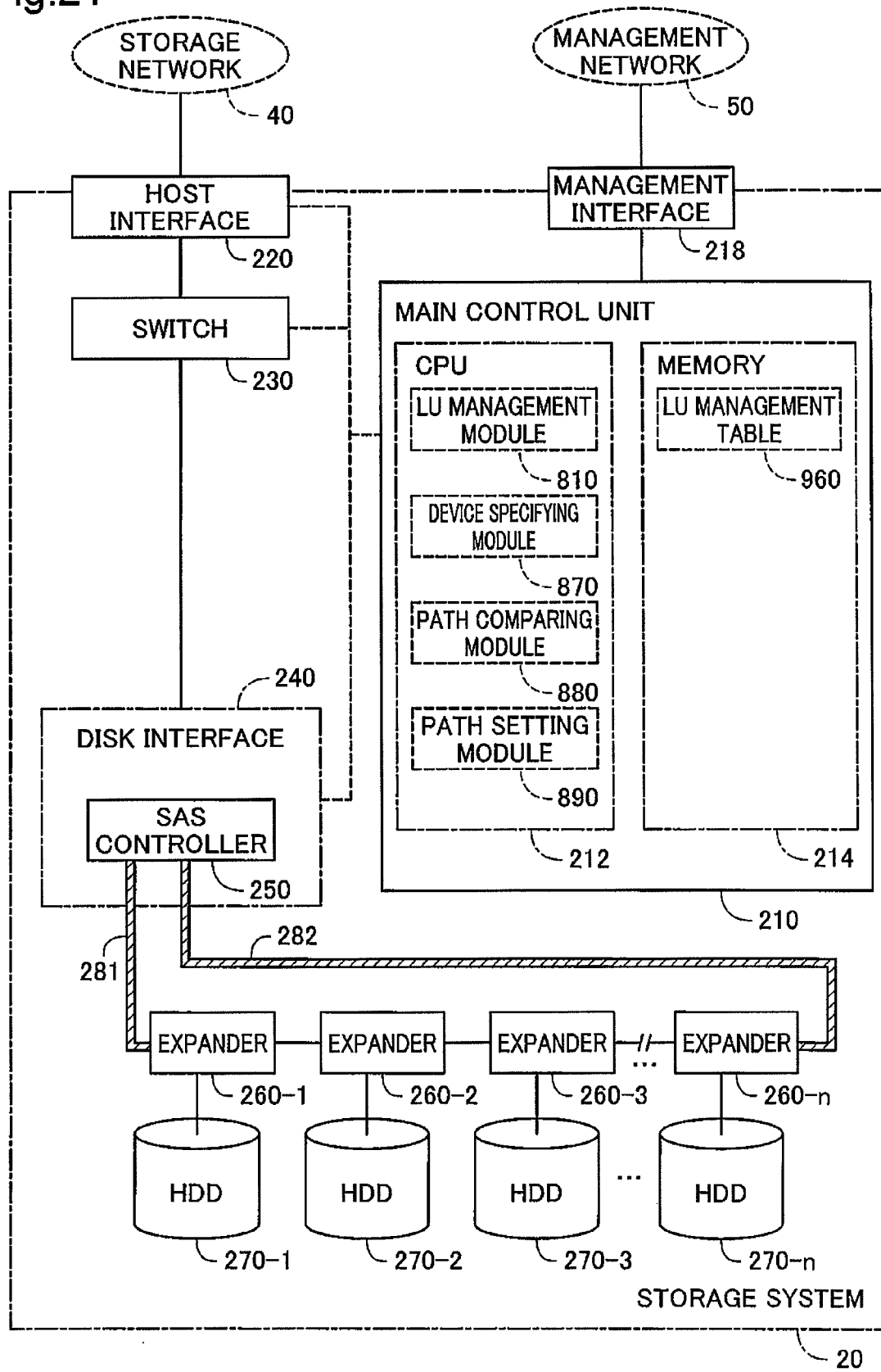
FIG. 21 shows an illustration depicting primarily the configuration of a storage system in Embodiment 2.

B. Embodiment 2:

B1. Computer System Configuration:

The configuration of the computer system 10 in Embodiment 2 is similar to that of the computer system 10 in Embodiment 1 except for the different configuration of the storage system 20. FIG. 21 is an illustration depicting primarily the configuration of the storage system 20 in Embodiment 2. The configuration of the storage system 20 in Embodiment 2 is similar to that of the storage system 20 in Embodiment 1, except for the different configuration of the main control unit 210, and the different connection configuration for the SAS controller 250, the expanders 260, and the HDDs 270.

In Embodiment 2, a number "n" (where "n" is a natural number) of expanders 260 are series-connected in a ring to the SAS controller 250. The expander 260-1 situated at one end of the multiple expanders 260 is connected directly to the SAS controller 250 by a path line 281 which interconnects SAS-compliant devices. The expander 260-n situated at the other end of the multiple expanders 260 is connected directly to the SAS controller 250 by a path line 282 which interconnects SAS-compliant devices. That is, the SAS controller 250 is parallel-connected directly to the first expander 260-1 and the second expander 260-n, respectively. To each of the plurality of expanders 260 is respectively connected one HDD 270, whereby a total of "n" HDDs 270 are connected to the SAS controller 250 in a daisy chain arrangement. In the example shown in FIG. 21, a single HDD 270 is connected to each single expander 260; however, in alternative embodiments, multiple HDDs 270 could be connected to a single expander 260, or expanders 260 having no HDDs 270 connected directly thereto could be present as well.

The main control unit 210 of Embodiment 2 includes in addition to the LU management module 810 a device designating module 870, a path comparing module 880, and a path setting module 890. The device designating module 870, the path comparing module 880, and the path setting module 890 of the main control unit 210 execute processes to function as a path adjusting unit for adjusting the number of expanders 260 on data transfer pathways between the SAS controller 250 and the HDDs 270. The device designating module 870 which constitutes part of the path adjusting unit will specify an HDD 270 targeted for adjustment from among the plurality of HDDs 270. The path comparing module 880 which constitutes part of the path adjusting unit will compare the number of expanders 260 on a first data transfer pathway leading to the HDD 270 which was specified by the device designating module 870, with the number of expanders 260 on a second data transfer pathway leading to the same HDD 270. The path setting module 890 which constitutes part of the path adjusting unit will then set the data transfer pathway which, of the data transfer pathways which were compared by the path setting module 890, has the smaller number of expanders 260 as the data transfer pathway to be used for the HDD 270 which was specified by the device designating module 870.

In the present embodiment, the main control unit 210 includes a CPU 212 and a memory 214. In the embodiment, the functions of the LU management module 810, the device designating module 870, the path comparing module 880, and the path setting module 890 will be carried out through execution of operation processes by the CPU 212 on the basis of software. In alternative embodiments, at least some of the functions of the LU management module 810, the target designating module 830, the device designating module 870, the path comparing module 880, and the path setting module 890 may be carried out through operation of the electronic circuits of the main control unit 210 based on their physical circuit configuration. The operations of the main control unit 210 will be discussed in detail later.

Figure 22:
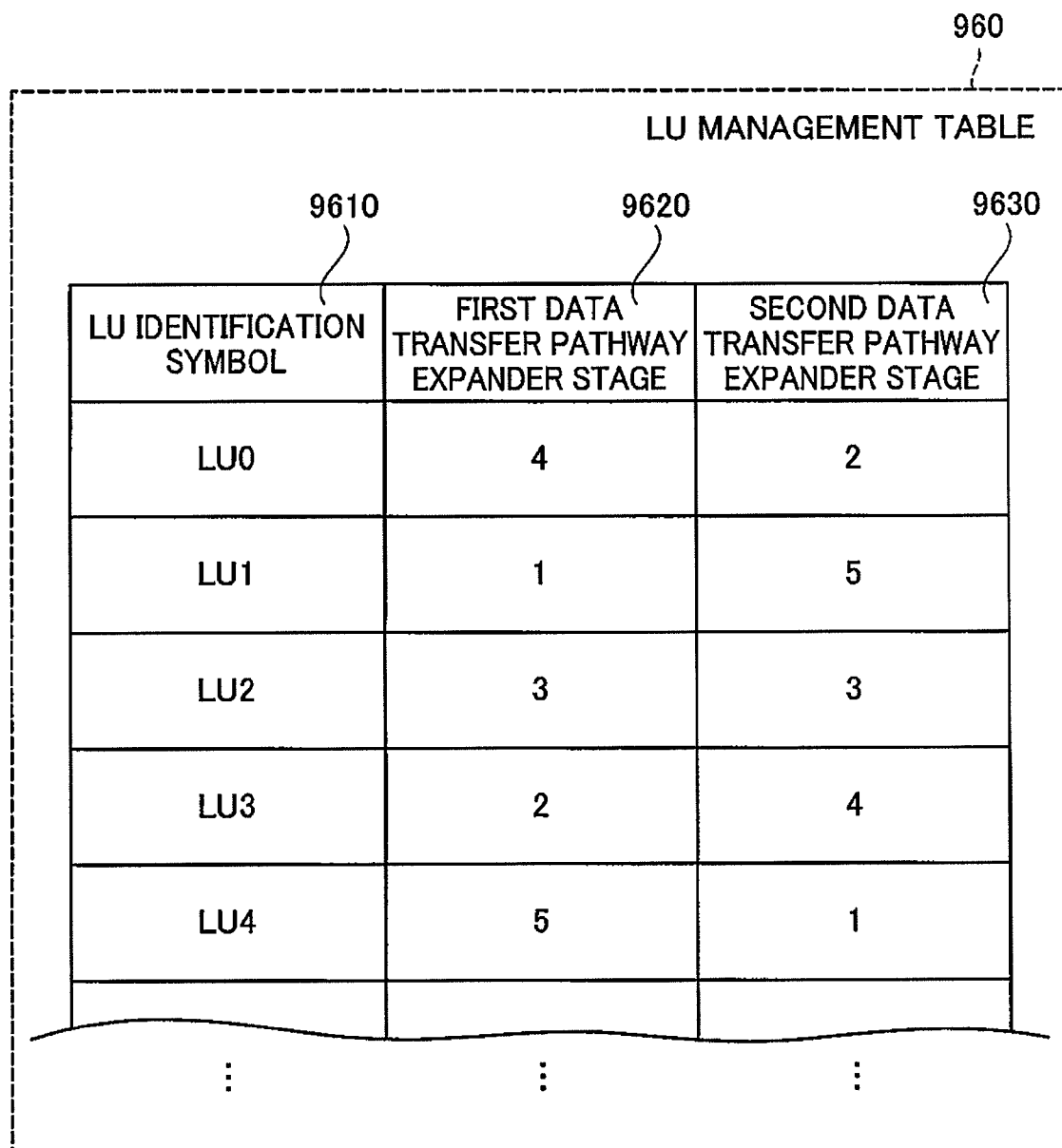
FIG. 22 shows an illustration depicting an LU management table in Embodiment 2.

An LU management table 960 is stored in the memory 214 of the main control unit 210. FIG. 22 is an illustration depicting the LU management table 960 in Embodiment 2. The LU management table 960 represents data containing information that indicates relationships among the logical units managed by the LU management module 810, the expanders 260, and the HDDs 270. In the present embodiment, the LU management table 960 will be updated in the event of changes in logical unit configuration or in the connection configuration of the HDDs 270.

The LU management table 960 contains LU identification symbols 9610, first data transfer pathway expander stage numbers 9620, and second data transfer pathway expander stage numbers 9630. The LU identification symbols 9610 in the LU management table 960 represent data individually identifying the logical units under management by the LU management module 810. The first expander stage numbers 9620 in the LU management table 960 represent data indicating the number of expanders 260 on a first data transfer pathway between the SAS controller 250 and the logical unit corresponding to the LU identification symbol 9610, and routed from the SAS controller 250 through the first expander 260-1 using a path line 281. The second expander stage numbers 9630 in the LU management table 960 represent data indicating the number of expanders 260 on a second data transfer pathway between the SAS controller 250 and the logical unit corresponding to the LU identification symbol 9610, and routed from the SAS controller 250 through the second expander 260-n using a path line 282.

In the example of FIG. 22, for the logical unit identified by the LU identification symbol "LU0," it is indicated that where the first data transfer pathway has been used the number of expanders on the pathway is be "4," and where the second data transfer pathway has been used, the number of expanders is "2." For the logical unit identified by the LU identification symbol "LU1," where the first data transfer pathway has been used the number of expanders on the pathway is "1," and where the second data transfer pathway has been used, the number of expanders is "5." For the logical unit identified by the LU identification symbol "LU2," where the first data transfer pathway has been used the number of expanders on the pathway is "3," and where the second data transfer pathway has been used, the number of expanders is "3." For the logical unit identified by the LU identification symbol "LU3," where the first data transfer pathway has been used the number of expanders on the pathway is "2," and where the second data transfer pathway has been used, the number of expanders is "4." For the logical unit identified by the LU identification symbol "LU4," where the first data transfer pathway has been used the number of expanders on the pathway is "5," and where the second data transfer pathway has been used, the number of expanders is "1"

Figure 23:
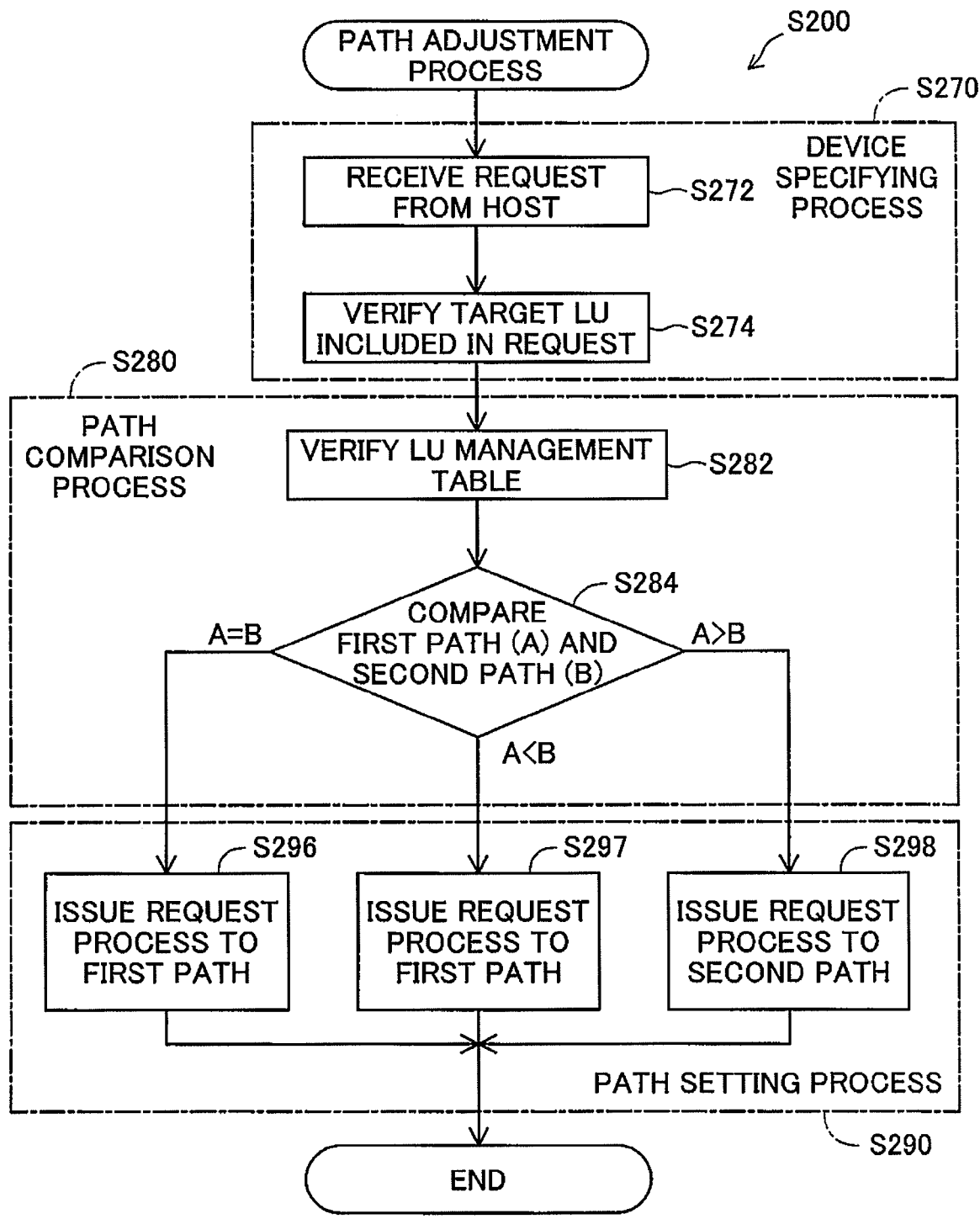
FIG. 23 shows a flowchart of a path adjustment process executed by the main control unit of the storage system in Embodiment 2.

B2. Computer System Operation:

FIG. 23 is a flowchart of a path adjustment process (Step S200) executed by the main control unit 210 of the storage system 20 in Embodiment 2. In the present embodiment, the main control unit 210 of the storage system 20 will execute the path adjustment process (Step S200) of FIG. 23 in the event that an access request (request for access) has been issued by a host computer 30. In the embodiment, the path adjustment process (Step S200) of FIG. 23 is carried out through operation of the CPU 212 of the main control unit 210 on the basis of software, but in an alternative embodiment could instead be carried out through operation of the electronic circuits of the main control unit 210 based on the physical circuit configuration.

When the path adjustment process (Step S200) of FIG. 23 is initiated, the main control unit 210 of the storage system 20 will operate as the device designating module 870 in order to execute a device specifying process (Step S270). In the device specifying process (Step S270), from among the plurality of HDDs 270, the main control unit 210 will specify an HDD 270 targeted for adjustment. In the device specifying process (Step S270), once an access request from a host computer 30 has been received (Step S272), the main control unit 210 will specify as the target for adjustment the HDD 270 associated with the logical unit which is included as the target in the access request (Step S274).

Subsequent to the device specifying process (Step S270), the main control unit 210 will function as the path comparing module 880 in order to execute a path comparison process (Step S280). In the path comparison process (Step S280), the main control unit 210 will compare the number of expanders 260 on a first data transfer pathway leading to the HDD 270 which was specified as the adjustment target in the device specifying process (Step S270), to the number of expanders 260 on a second data transfer pathway also leading to the HDD 270. In the path comparison process (Step S280), the main control unit 210 will refer to the LU management table 960 saved in the memory 214 and verify the number of expander stages on the first and second data transfer pathways on which is located the logical unit in the HDD 270 which is the adjustment target (Step S282), and will then compare the first and second number of expander stages.

Subsequent to the path comparison process (Step S280), the main control unit 210 will operate as the path setting module 890 in order to execute a path setting process (Step S290). In the path setting process (Step S290), from the data transfer pathways which were compared in the path comparison process (Step S280), the main control unit 210 will set the data transfer pathway with the smaller number of expanders 260 as the data transfer pathway for use with the HDD 270 that was specified as the adjustment target in the device specifying process (Step S270). In the path setting process (Step S290), if the number of first expander stages is smaller than the number of second expander stages, the main control unit 210 will issue a request process to the first data transfer pathway, i.e. to the data transfer pathway which uses the path line 281, in order to set the first data transfer pathway as the data transfer pathway to be used with the HDD 270 that was specified as the adjustment target (Step S297). If the number of first expander stages is greater than the number of second expander stages, the main control unit 210 will issue a request process to the second data transfer pathway, i.e. to the data transfer pathway which uses the path line 282, in order to set the second data transfer pathway as the data transfer pathway for use with the HDD 270 that was specified as the adjustment target (Step S298). In the present embodiment, if the number of first expander stages and the number of second expander stages are the same, the main control unit 210 will issue a request process to the first data transfer pathway, i.e. to the data transfer pathway which uses the path line 281, in order to set the first data transfer pathway as the data transfer pathway to be used with the HDD 270 that was specified as the adjustment target (Step S296). In an alternative embodiment, in the event that the number of first expander stages and the number of second expander stages are the same, the main control unit 210 could instead set the second data transfer pathway as the data transfer pathway for use with the HDD 270 that was specified as the adjustment target; or could alternate between the first and second data transfer pathways each time that the path adjustment process (Step S200) is executed. In the present embodiment, the data transfer pathway is switched by changing the target to which the request process is issued, but in an alternative embodiment, switching of the data transfer pathway could be accomplished through physical switching of the path line.

B3. Effects:

According to the storage system 20 in Embodiment 2 described above, a data transfer pathway having a smaller number of expanders 260 is selected with reference to the data, whereby latency attributable to the number of expanders 260 on the data transfer pathway can be avoided. Moreover, a data transfer pathway having smaller number of expanders 260 can be selected from among data transfer pathways which are routed through respectively different expanders 260-1, 260-n which are connected directly to the SAS controller 250. Furthermore, since the number of expanders 260 on the data transfer pathway will be adjusted (Step S272) in response to issuance of an access request, latency attributable to the number of expanders on the data transfer pathway can be avoided according to the issued access request.

B4. Modification Examples:

B4-1. Modification Example b1:

In the preceding Embodiment 2, the SAS controller 250 was parallel-connected directly to the first expander 260-1 and the second expander 260-n respectively, an alternative embodiment would be possible as well.

Figure 24:
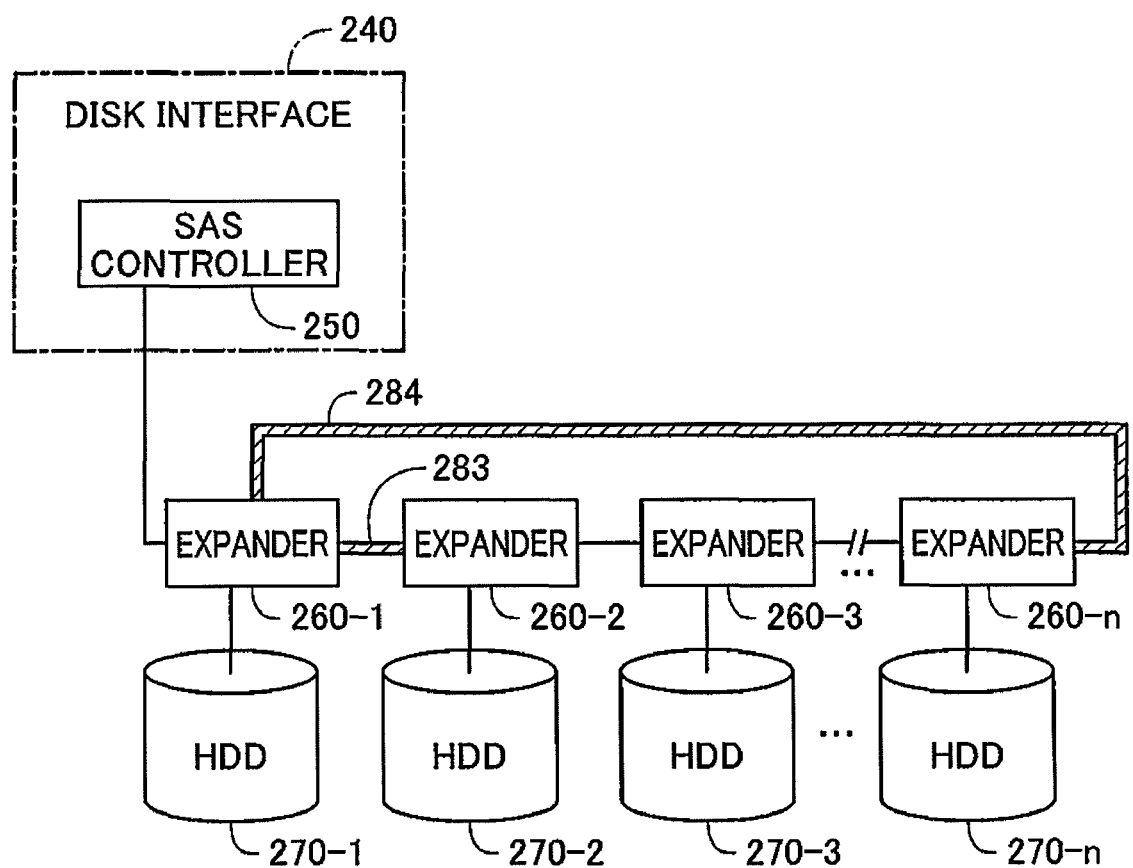
FIG. 24 shows an illustration depicting a connection configuration among an SAS controller and expanders in Modification Example b1.

FIG. 24 is an illustration depicting a connection configuration for the SAS controller 250 and the expanders 260 in Modification Example b1. In the example of FIG. 24, a number "n" (where "n" is a natural number) of expanders 260 are series-connected in a row to the SAS controller 250. The expander 260-1 situated at one end of the multiple expanders 260 is connected directly to the expander 260-2 by a path line 283, and is also connected directly to the expander 260-n at the other end through a path line 284. That is, the first expander 260-1 is parallel-connected directly to a second expander 260-2 and to a third expander 260-n respectively. To each of the plurality of expanders 260 is respectively connected one HDD 270, whereby a total of "n" HDDs 270 are connected to the SAS controller 250 in a daisy chain arrangement. In the example shown in FIG. 24, a single HDD 270 is connected to each single expander 260; however, in alternative embodiments, multiple HDDs 270 could be connected to a single expander 260, or expanders 260 having no HDDs 270 connected directly thereto could be present as well.

Operation of the storage system 20 in Modification Example b1 is similar to that of Embodiment 2, with the exception that the first data transfer pathway is a pathway between the SAS controller 250 and the HDDs 270, which is routed via the first expander 260-1 and the second expander 260-2 by using the path line 283; and that the second data transfer pathway is a pathway between the SAS controller 250 and the HDDs 270, which is routed via the first expander 260-1 and the third expander 260-n by using the path line 284.

According to the storage system 20 of Modification Example b1, a data transfer pathway having a smaller number of expanders 260 can be selected from among data transfer pathways which branch off from the first expander 260-1 and are routed through the respectively different second expander 260-2 and third expander 260-n.

Figure 25:
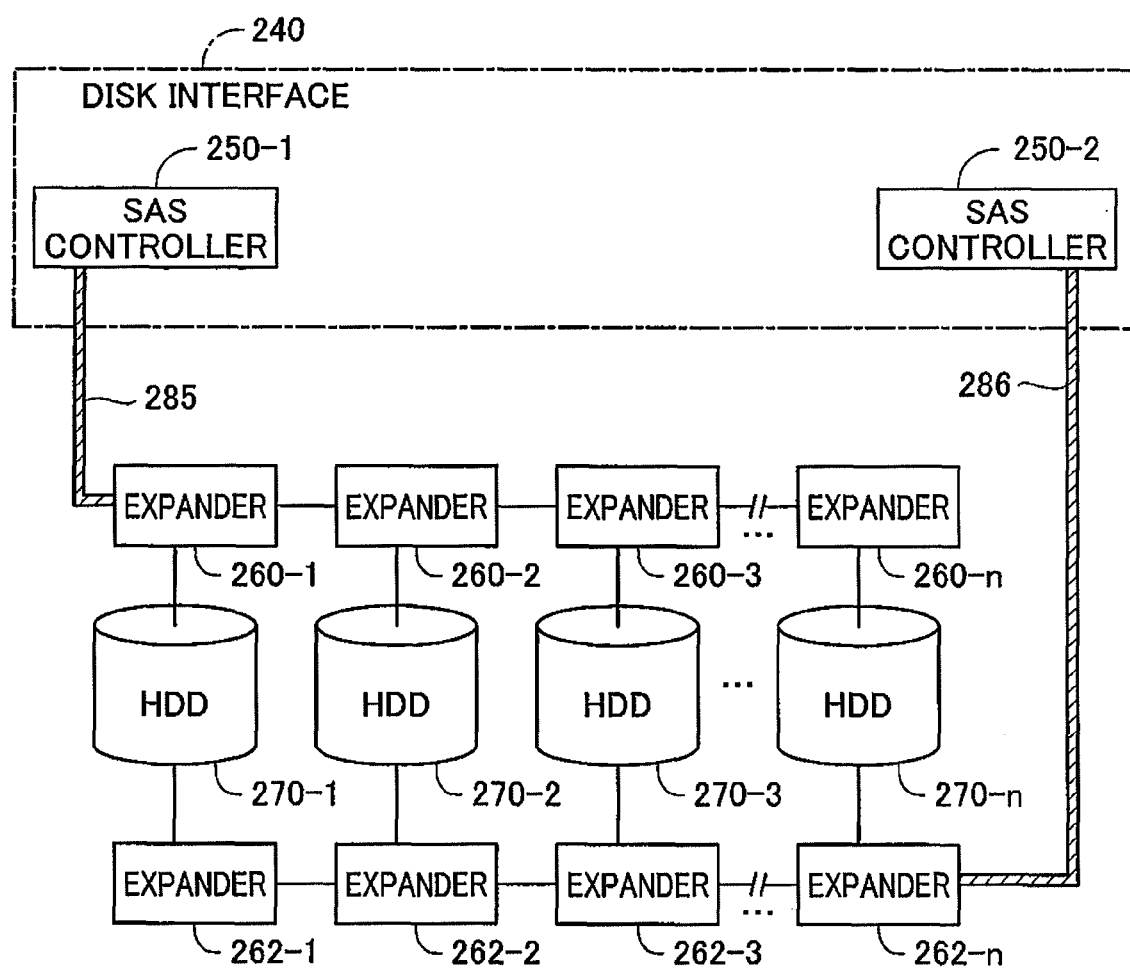
FIG. 25 shows an illustration depicting a connection configuration for SAS controllers and expanders in Modification Example b2.

B4-2. Modification Example b2:

FIG. 25 is an illustration depicting a connection configuration for the SAS controllers 250 and the expanders 260 in Modification Example b2. In the example of FIG. 25, the storage system 20 includes a first SAS controller 250-1 and a second SAS controller 250-2. A number "n" (where "n" is a natural number) of expanders 260 are series-connected in a row to the first SAS controller 250-1. The expander 260-1 situated at one end of the multiple expanders 260 is connected to the first SAS controller 250-1 by a path line 285. Meanwhile, a number "n" of expanders 262 are series-connected in a row to the second SAS controller 250-2. Herein, with regard to symbols assigned to the expanders, in order to identify their positional relationship to the second SAS controller 250-2, the expanders will be labeled expander 260-1, 260-2, 260-3, . . . , 260-n in order from that furthest away from the second SAS controller 250-2; where they are referred to collectively without identifying position with respect to the SAS controller 250, they will be denoted simply as expanders 262. The expander 262-n situated at one end of the multiple expanders 262 is connected to the second SAS controller 250-2 by a path line 286. The multiple expanders 260 are individually connected respectively to individual HDDs 270 to which the multiple expanders 262 are also individually connected, whereby a total of "n" HDDs 270 are connected in common to both the first SAS controller 250-1 and the second SAS controller 250-2 in a daisy chain connection. In the example shown in FIG. 25, each single HDD 270 is connected in common to a single expander 260 and 262; however, in an alternative embodiment, a plurality of HDDs 270 could connected in common to a single expander 260 and 262; or expanders 260, 262 having no HDDs 270 connected directly thereto could be present as well.

Operation of the storage system 20 in Modification Example b2 is similar to that in Embodiment 2, with the exception that a first data transfer pathway between the first SAS controller 250-1 and the HDDs 270 is routed through the expanders 260 using the path line 285, while a second data transfer pathway between the second SAS controller 250-2 and the HDDs 270 is routed through the expanders 262 using the path line 286.

According to the storage system 20 of Modification Example b2, a data transfer pathway having a smaller number of expanders 260 can be selected from among data transfer pathways which are routed through the respectively different SAS controllers 250-1 and 250-2.

Figure 26:
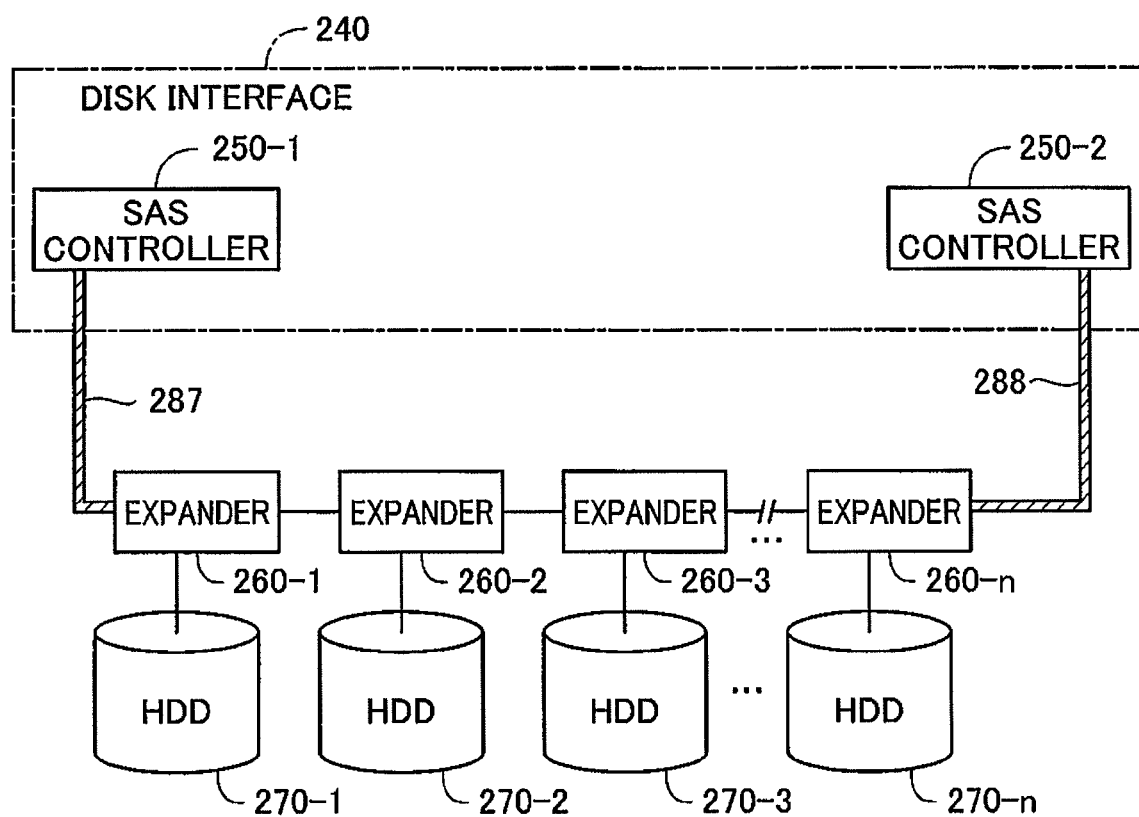
FIG. 26 shows an illustration depicting a connection configuration for SAS controllers and expanders in Modification Example b2.

B4-3. Modification Example b3:

FIG. 26 is an illustration depicting a connection configuration for the SAS controllers 250 and the expanders 260 in Modification Example b3. In the example of FIG. 26, the storage system 20 includes a first SAS controller 250-1 and a second SAS controller 250-2. A number "n" (where "n" is a natural number) of expanders 260 are series-connected in a row to the first SAS controller 250-1. The expander 260-1 situated at one end of the multiple expanders 260 is connected to the first SAS controller 250-1 by a path line 287. Meanwhile, the expander 260-n situated at the other end of the multiple expanders 260 is connected to the second SAS controller 250-2 by a path line 288. The multiple expanders 260 are individually connected respectively to individual HDDs 270, whereby a total of "n" HDDs 270 are connected to the first SAS controller 250-1 and the second SAS controller 250-2 in a daisy chain connection. In the example shown in FIG. 26, each single HDD 270 is connected to a single expander 260; however, in an alternative embodiment, a plurality of HDDs 270 could connected in common to a single expander 260; or expanders 260 having no HDDs 270 connected directly thereto could be present as well.

Operation of the storage system 20 in Modification Example b3 is similar to that of Embodiment 2, with the exception that the first data transfer pathway is a pathway between the first SAS controller 250-1 and the HDDs 270 which is routed through the expanders 260 using the path line 287; and the second data transfer pathway is a pathway between the second SAS controller 250-2 and the HDDs 270 which is routed through the expanders 262 using the path line 288.

According to the storage system 20 of Modification Example b3, a data transfer pathway having a smaller number of expanders 260 can be selected from among data transfer pathways which are routed through the respectively different SAS controllers 250-1 and 250-2.

C. Alternative Embodiments:

The foregoing description of the invention based on certain preferred embodiments is provided for illustration only and not for the purpose of limiting the invention, and various modifications such as the following can be made herein without departing from the scope of the invention. For example, in the present embodiments the path adjustment process (Step S100, S200) is carried out by the main control unit 210 in the storage system 20, but in an alternative embodiment could be carried out by the storage management device 60 instead.

C1. Modification Example a11:

In the preceding Embodiment 1, during the path adjustment process (Step S100), the main control unit 210 of the storage system 20 carried out the data migration process (Step S160) in response to a change in the connection configuration of the HDDs 270 (Step S110); however, the data migration process (Step S160) could instead be carried out in response to updating of the requested performance table 920 which is stored in the memory 214 of the main control unit 210.

Figure 27:
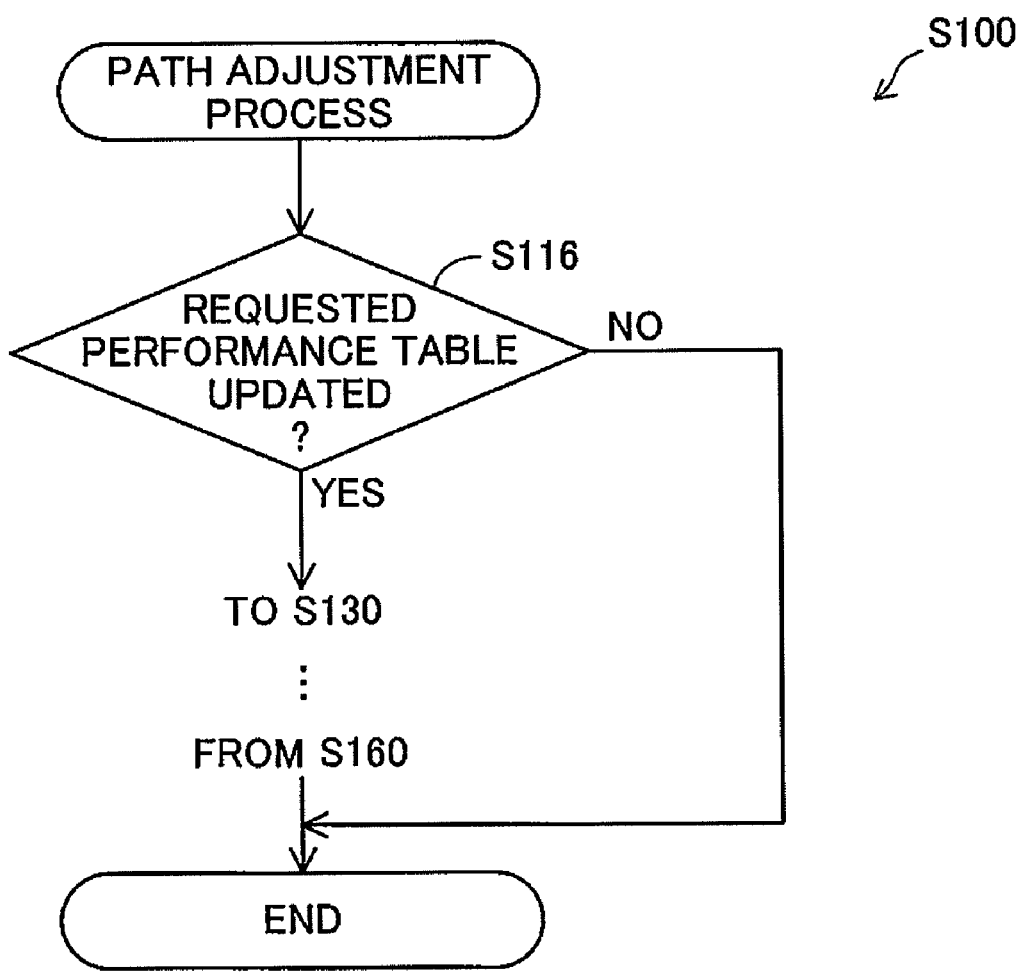
FIG. 27 shows a flowchart depicting a path adjustment process in Modification Example a11.

FIG. 27 is a flowchart depicting the path adjustment process (Step S100) in Modification Example a11. In Modification Example a11, the main control unit 210 of the storage system 20 determines whether the requested performance table 920 which is stored in the memory 214 of the main control unit 210 has been updated (Step S116). In the present embodiment, the requested performance table 920 in the main control unit 210 is updated on the basis of an instruction from the storage management device 60. In an alternative embodiment, the requested performance table 920 in the main control unit 210 could instead be updated on the basis of an instruction from a host computer 30; or where the storage system 20 is equipped with interface for receiving administrator input, updated on the basis of information input via the interface. If the requested performance table 920 in the main control unit 210 has been updated (Step S116), the main control unit 210 will sequentially execute the target specifying process (Step S130), the destination selection process (Step S150), and the data migration process (Step S160) in the same manner as in the path adjustment process (Step S100) of FIG. 6.

According to the storage system 20 of Modification Example a11, latency attributable to the number of expanders 260 on the data transfer pathway can be avoided with reference to changes in requested performance required of logical units.

According to the first aspect of the invention, the destination selecting unit may select, based on data transfer rate required for the specified target data, the storage device in which to store the specified target data to reduce the number of expanders on the data transfer pathway for the specified target data. According to the above-mentioned storage system, data can be migrated to a storage device connected to the controller device by a number of expanders appropriate for the requested performance data transfer rate.

According to the first aspect of the invention, the target specifying unit may include a first specifying unit that specifies, as the target data to be targeted for adjustment, data for which required data transfer rate is higher than for data in an other storage device connected to the controller device via the smaller number of expanders. According to the above-mentioned storage system, data for which relatively high transfer rate is requested performance can be migrated to a storage device connected via a smaller number of expanders.

According to the first aspect of the invention, the target specifying unit may include a second specifying unit that specifies, as the target data to be targeted for adjustment, data which is accessed with higher frequency than data in an other storage device connected to the controller device via the smaller number of expanders. According to the above-mentioned storage system, data accessed with relatively high frequency can be migrated to a storage device connected via a smaller number of expanders.

According to the first aspect of the invention, the target specifying unit may include a third specifying unit that, when the amount of data stored in the storage system exceeds a prescribed value, specifies, as the target data to be targeted for adjustment, data stored in a storage device for which the number of expanders on a data transfer pathway to the controller device exceeds a prescribed number. According to the above-mentioned storage system, in the event of an increase in the amount of data, data stored in a storage device that is connected to a relatively downstream stage expander can be selected as data for which improved data transfer rate is imperative.

According to the first aspect of the invention, the target specifying unit may include a fourth specifying unit that, when an additional expander is added to the storage system, specifies, as the target data to be targeted for adjustment, data stored in a storage device for which the number of expanders on a data transfer pathway to the controller device is increased. According to the above-mentioned storage system, when the amount of data has increased, data associated with an increased number of transfer pathways owing to an increased number of expanders can be selected as data for which improved data transfer rate is imperative.

According to the first aspect of the invention, the target specifying unit may include a fifth specifying unit that specifies, as the target data to be targeted for adjustment, data which is accessed in a data length less than a prescribed value. According to the above-mentioned storage system, data accessed in a data length less than a prescribed value can be specified as data for which high transfer rates are requested performance.

According to the first aspect of the invention, the target specifying unit may include a sixth specifying unit that specifies, as the target data to be targeted for adjustment, data which is random accessed data. According to the above-mentioned storage system, random access data can be selected as data for which high transfer rates are requested performance.

According to the first aspect of the invention, the storage system may further comprise a logical unit management unit that manages a storage area in the plurality of storage devices as a plurality of logical units. In this case, the target specifying unit may specify the target data to be targeted for adjustment in units of the plurality of logical units. According to the above-mentioned storage system, since data migration is carried out using units of logical units, it is possible to avoid a more complex logical unit configuration in the storage system.

According to the second aspect of the invention, the controller device may be directly connected to a first expander and a second expander among the plurality of expanders. In this case, the path comparing unit may compare the number of expanders on a first data transfer pathway routed through the first expander, and the number of expanders on a second data transfer pathway routed through the second expander. According to the above-mentioned storage system, a data transfer pathway with fewer expanders can be selected from among a number of data transfer pathways routed through respectively different expanders connected directly to the controller device.

According to the second aspect of the invention, the plurality of expanders may include a first expander, a second expander and a third expander. The first expander is directly connected to the second expander and the third expander. In this case, the path comparing unit may compare the number of expanders on a first data transfer pathway routed through the first expander and the second expander, and the number of expanders on a second data transfer pathway routed through the first expander and the third expander. According to the above-mentioned storage system, a data transfer pathway with fewer expanders can be selected from among several data transfer pathways routed through respectively different expanders branched from other expanders.

According to the second aspect of the invention, the controller device may include a first controller device and a second controller device. In this case, the path comparing unit may compare the number of expanders on a first data transfer pathway routed through the first controller device, and the number of expanders on a second data transfer pathway routed through the second controller device. According to the above-mentioned storage system, a data transfer pathway with fewer expanders can be selected from among several data transfer pathways routed through respectively different controller devices.

According to the first aspect or the second aspect of the invention, the path adjusting unit may adjust the number of expanders on the data transfer pathway between the controller device and the storage device when at least one of an additional controller device, an additional storage device and an additional expander is added to the storage system. According to the above-mentioned storage system, it will be possible to avoid latency attributable to the number of expanders on the data transfer pathway, in association with an increase in the number of controller devices, storage devices, or expanders.

According to the first aspect or the second aspect of the invention, the path adjusting unit may adjust the number of expanders on the data transfer pathway between the controller device and the storage device when an additional access originator that accesses the storage system is added to the storage system. According to the above-mentioned storage system, it will be possible to avoid latency attributable to the number of expanders on the data transfer pathway, in association with an increase in the number of access originators.

According to the first aspect or the second aspect of the invention, the path adjusting unit may adjust the number of expanders on the data transfer pathway between the controller device and the storage device when the amount of data stored in the storage system exceeds a prescribed value. According to the above-mentioned storage system, it will be possible to avoid latency attributable to the number of expanders on the data transfer pathway, in association with an increase in the amount of data.

According to the first aspect or the second aspect of the invention, the path adjusting unit may adjust the number of expanders on the data transfer pathway between the controller device and the storage device when new data is stored in the storage system. According to the above-mentioned storage system, it will be possible to avoid latency attributable to the number of expanders on the data transfer pathway, in association with data which are newly stored in the storage system.

According to the first aspect or the second aspect of the invention, the path adjusting unit may adjust the number of expanders on the data transfer pathway between the controller device and the storage device when an access request is issued to the storage system. According to the above-mentioned storage system, it will be possible to avoid latency attributable to the number of expanders on the data transfer pathway, in association with an issued access request.

According to the first aspect or the second aspect of the invention, the path adjusting unit may adjust the number of expanders on the data transfer pathway between the controller device and the storage device at periodic intervals. According to the above-mentioned storage system, it will be possible to periodically execute a process for the purpose of avoiding latency attributable to the number of expanders on the data transfer pathway.

According to the first aspect or the second aspect of the invention, the communication protocol may be a protocol compliant with at least one of SAS and SATA. According to the above-mentioned storage system, it will be possible to avoid latency attributable to the number of expanders on the data transfer pathway, in a storage system in which SAS (Serial Attached SCSI) or SATA (Serial ATA) has been implemented.

Although the invention has been described and illustrated in detail, it is clearly understood that the same is by way of illustration and example only and is not to be taken by way of limitation, the spirit and scope of the invention being limited only by the terms of the appended claims.

What is claimed is:

1. A storage system for storing data,
the storage system comprising:
a plurality of storage devices for storing the data that is compliant with a communication protocol for peer to peer communication between daisy chain connected devices;
a controller device that, compliant with the communication protocol, controls the plurality of storage devices;
a plurality of expanders, on data transfer pathways between the controller device and plurality of storage devices, that connect the controller device and the plurality of storage devices by daisy chain connection compliant with the communication protocol; and
a path adjusting unit that adjusts the number of expanders on one of said data transfer pathways between the controller device and one of said storage devices;
wherein the path adjusting unit includes:
a target specifying unit that specifies target data to be targeted for adjustment from among data stored in the plurality of storage devices;
a destination selecting unit that selects, from among the plurality of storage devices, a storage device in which to store the specified target data to reduce the number of expanders on a data transfer pathway for the specified target data; and
a data migrating unit that migrates the specified target data to the selected storage device; and
wherein the target specifying unit includes a third specifying unit that, when the amount of data stored in the storage system exceeds a prescribed value, specifies, as the target data to be targeted for adjustment, data stored in a storage device for which a number of expanders on a data transfer pathway to the controller device exceeds a prescribed number.

2. The storage system according to claim 1,
wherein the destination selecting unit selects, based on data transfer rate required for the specified target data, the storage device in which to store the specified target data to reduce the number of expanders on the data transfer pathway for the specified target data.

3. The storage system according to claim 1,
wherein the target specifying unit includes a first specifying unit that specifies, as the target data to be targeted for adjustment, data for which required data transfer rate is higher than for data in one of said plurality of storage that is connected to the controller device via the reduced number of expanders.

4. The storage system according to claim 1,
wherein the target specifying unit includes a second specifying unit that specifies, as the target data to be targeted for adjustment, data which is accessed with higher frequency than data in one of said plurality of storage devices connected to the controller device via the reduced of expanders.

5. The storage system according to claim 1,
wherein the target specifying unit includes a fourth specifying unit that, when an additional expander is added to the storage system, specifies, as the target data to be targeted for adjustment, data stored in a storage device for which the expander on a data transfer pathway to the controller device was added.

6. The storage system according to claim 1,
wherein the target specifying unit includes a fifth specifying unit that specifies, as the target data to be targeted for adjustment, data which is accessed in a data length less than a prescribed value.

7. The storage system according to claim 1,
wherein the target specifying unit includes a sixth specifying unit that specifies, as the target data to be targeted for adjustment, data which is random accessed data.

8. The storage system according to claim 1,
the storage system further comprising a logical unit management unit that manages a storage area in the plurality of storage devices as a plurality of logical units,
wherein the target specifying unit specifies the target data to be targeted for adjustment in units of the plurality of logical units.

9. The storage system according to claim 1,
wherein the path adjusting unit adjusts the number of expanders on the data transfer pathway between the controller device and the storage device when at least one of an additional controller device, an additional storage device and an additional expander is added to the storage system.

10. The storage system according to claim 1,
wherein the path adjusting unit adjusts the number of expanders on the data transfer pathway between the controller device and the storage device when an additional access originator that accesses the storage system is added to the storage system.

11. The storage system according to claim 1,
wherein the path adjusting unit adjusts the number of expanders on the data transfer pathway between the controller device and the storage device when the amount of data stored in the storage system exceeds a prescribed value.

12. The storage system according to claim 1,
wherein the path adjusting unit adjusts the number of expanders on the data transfer pathway between the controller device and the storage device when new data is stored in the storage system.

13. The storage system according to claim 1,
wherein the path adjusting unit adjusts the number of expanders on the data transfer pathway between the controller device and the storage device when an access request is issued to the storage system.

14. The storage system according to claim 1,
wherein the path adjusting unit adjusts the number of expanders on the data transfer pathway between the controller device and the storage device at periodic intervals.

15. The storage system according to claim 1,
wherein the communication protocol is a protocol compliant with at least one of SAS and SATA.

16. A storage system for storing data,
the storage system comprising:
a plurality of storage devices for storing the data that is compliant with a communication protocol for peer to peer communication between daisy chain connected devices;
a controller device that, compliant with the communication protocol, controls the plurality of storage devices;
a plurality of expanders, on data transfer pathways between the controller device and plurality of storage devices, that connect the controller device and the plurality of storage devices by daisy chain connection compliant with the communication protocol; and
a path adjusting unit that adjusts the number of expanders on the data transfer pathways between the controller device and the storage device;
wherein the path adjusting unit includes:
a device specifying unit that specifies a storage device to be targeted for adjustment from among the plurality of storage devices;
a path comparing unit that compares the number of expanders on a first data transfer pathway and the number of expanders on a second data transfer pathway, wherein the first and second data transfer pathway lead to the specified storage device through different routes; and
a path setting unit that sets, as a data transfer pathway for the specified storage device, the compared data transfer pathway which has the smaller number of expanders; and
wherein the target specifying unit includes a third specifying unit that, when the amount of data stored in the storage system exceeds a prescribed value, specifies, as the target data to be targeted for adjustment, data stored in a storage device for which the number of expanders on a data transfer pathway to the controller device exceeds a prescribed number.

17. The storage system according to claim 16, wherein:
the controller device is directly connected to a first expander and a second expander among the plurality of expanders; and
the path comparing unit compares the number of expanders on said first data transfer pathway routed through the first expander, and the number of expanders on said second data transfer pathway routed through the second expander.

18. The storage system according to claim 16, wherein:
the plurality of expanders includes a first expander, a second expander and a third expander, wherein the first expander is directly connected to the second expander and the third expander; and
the path comparing unit compares the number of expanders on a first data transfer pathway routed through the first expander and the second expander, and the number of expanders on a second data transfer pathway routed through the first expander and the third expander.

19. The storage system according to claim 16, wherein:
the controller device includes a first controller device and a second controller device; and
the path comparing unit compares the number of expanders on said first data transfer pathway routed through the first controller device, and the number of expanders on said second data transfer pathway routed through the second controller device.

* * * * *